(12) United States Patent
Speicher et al.

(10) Patent No.: US 12,603,923 B2
(45) Date of Patent: Apr. 14, 2026

(54) CAPABILITY SIGNALING

(71) Applicant: QUALCOMM INCORPORATED,
San Diego, CA (US)

(72) Inventors: Sebastian Speicher, Wallisellen (CH);
Haris Zisimopoulos, London (GB)

(73) Assignee: QUALCOMM Incorporated, San
Diego, CA (US)

( * ) Notice: Subject to any disclaimer, the term of this
patent is extended or adjusted under 35
U.S.C. 154(b) by 0 days.

(21) Appl. No.: 18/693,480

(22) PCT Filed: Oct. 28, 2022

(86) PCT No.: PCT/US2022/078916
§ 371 (c)(1),
(2) Date: Mar. 19, 2024

(87) PCT Pub. No.: WO2023/081608
PCT Pub. Date: May 11, 2023

(65) Prior Publication Data
US 2024/0396951 A1 Nov. 28, 2024

(30) Foreign Application Priority Data

Nov. 3, 2021 (GR) ............................... 20210100767

(51) Int. Cl.
*G06F 15/16* (2006.01)
*H04L 65/1069* (2022.01)
*H04W 48/04* (2009.01)

(52) U.S. Cl.
CPC ......... *H04L 65/1069* (2013.01); *H04W 48/04*
(2013.01)

(58) Field of Classification Search
None
See application file for complete search history.

(56) References Cited

U.S. PATENT DOCUMENTS 11,523,271 B1 12/2022 Bertz et al.
2020/0351762 A1* 11/2020 Casati ..................... H04W 8/24
(Continued)

FOREIGN PATENT DOCUMENTS

EP 3813336 A2 4/2021
WO WO-2020256911 A1 12/2020

OTHER PUBLICATIONS

Intel Corporation: "Discussion of the Capability ID Transfer from
the UE", R2-1906345, resubmission of R2-1094461, 3GPP TSG-
RAN WG2 meeting #106, 3rd Generation Partnership Project,
Mobile Competence Centre, 650, Route Des Lucioles, F-06921
Sophia-Antipolis Cedex, France, vol. RAN WG2, No. Reno, Nevada,
US, May 13, 2019-May 17, 2019 May 13, 2019, XP051729812, 6
Pages, [retrieved on May 13, 2019] the whole document.
(Continued)

*Primary Examiner* — Wing F Chan
*Assistant Examiner* — Andrew Woo
(74) *Attorney, Agent, or Firm* — Holland & Hart LLP

(57) ABSTRACT

Methods, systems, and devices for wireless communications
are described herein. For example, a UE may transmit a
radio capability identifier to a network entity. In some
examples, the radio capability identifier may indicate a set of
radio capabilities of the UE. In response to receiving the
radio capability identifier, the network entity may determine
feedback indicating whether the set of radio capabilities
indicated by the radio capability identifier satisfy a respec-
tive radio capabilities of a radio capability profile for an
application associated with the UE. The network entity may
transmit the determined feedback to the UE and, in response,
the UE may establish a session for the application associated
with the UE.

30 Claims, 20 Drawing Sheets

(56) References Cited

U.S. PATENT DOCUMENTS

2020/0404720 A1 *  12/2020  Zisimopoulos ....... H04W 8/205
2021/0105596 A1 *  4/2021  Prabhakar .............. H04W 4/50

OTHER PUBLICATIONS

International Search Report and Written Opinion—PCT/US2022/078916—ISA/EPO—Jan. 31, 2023.

* cited by examiner

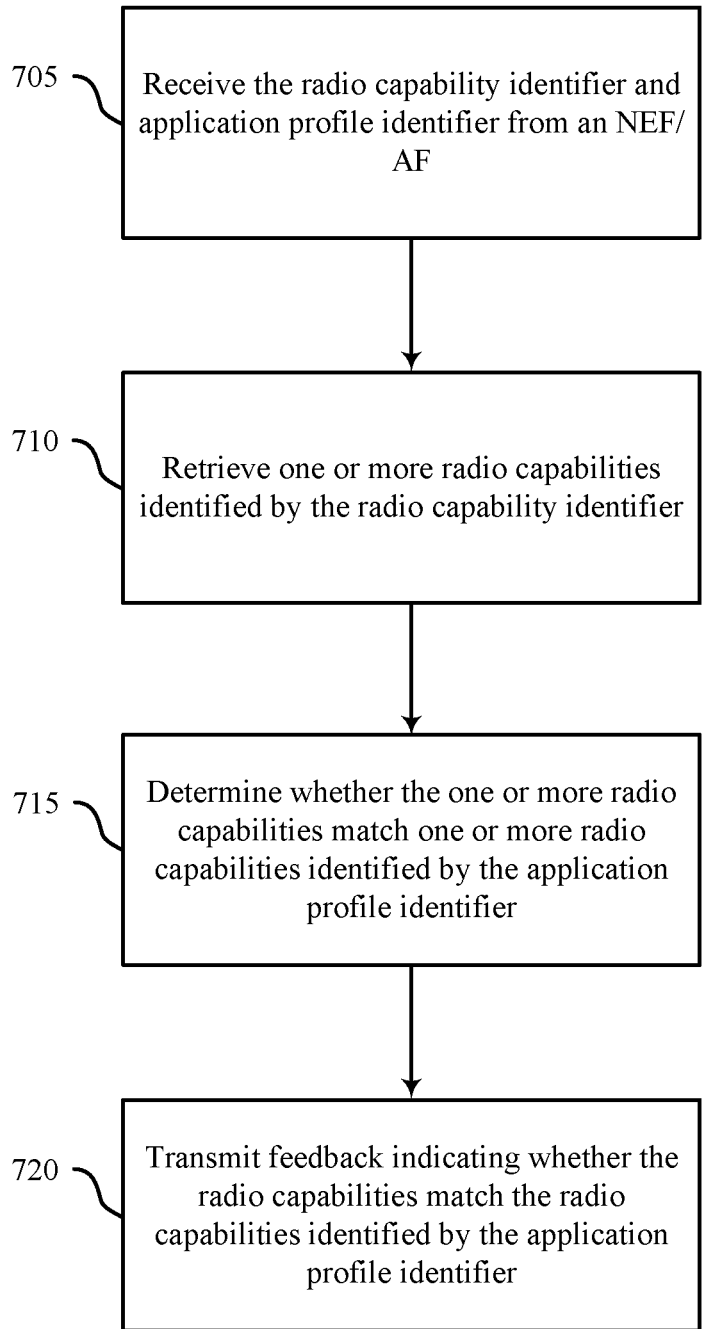

705 — Receive the radio capability identifier and application profile identifier from an NEF/AF 710 — Retrieve one or more radio capabilities identified by the radio capability identifier 715 — Determine whether the one or more radio capabilities match one or more radio capabilities identified by the application profile identifier 720 — Transmit feedback indicating whether the radio capabilities match the radio capabilities identified by the application profile identifier

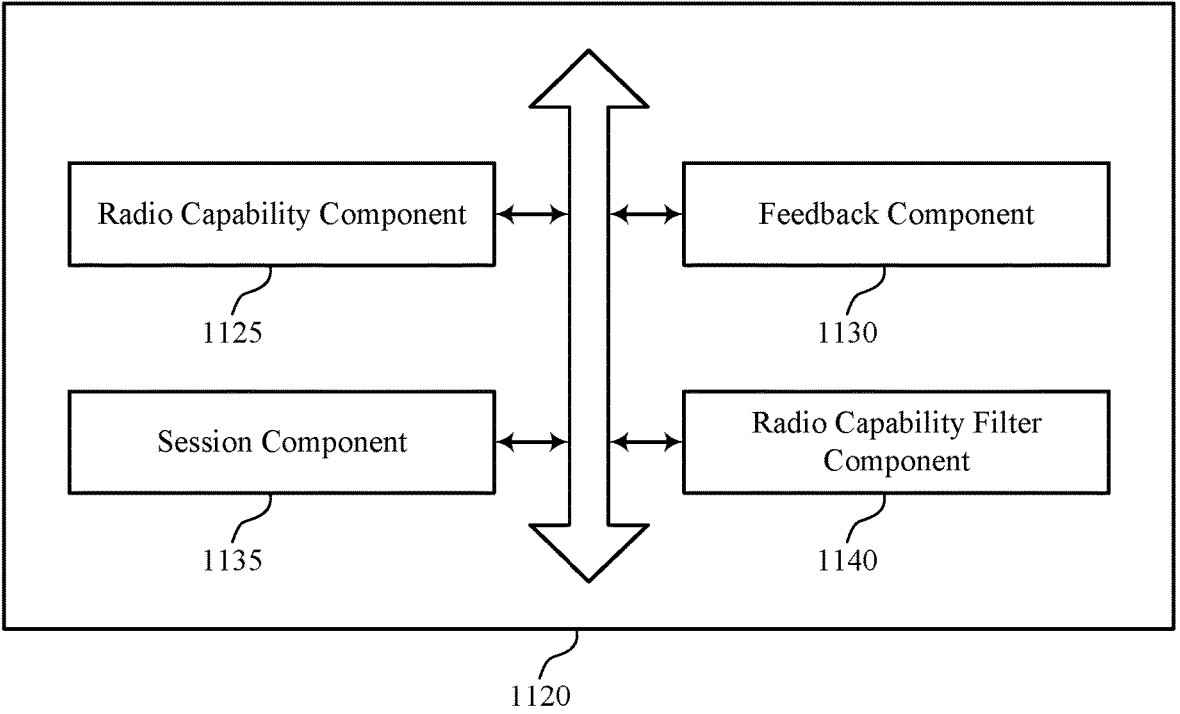
Radio Capability Component
1125
Feedback Component
1130
Session Component
1135
Radio Capability Filter Component
1140
1120
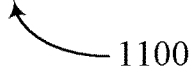
1100
FIG. 11

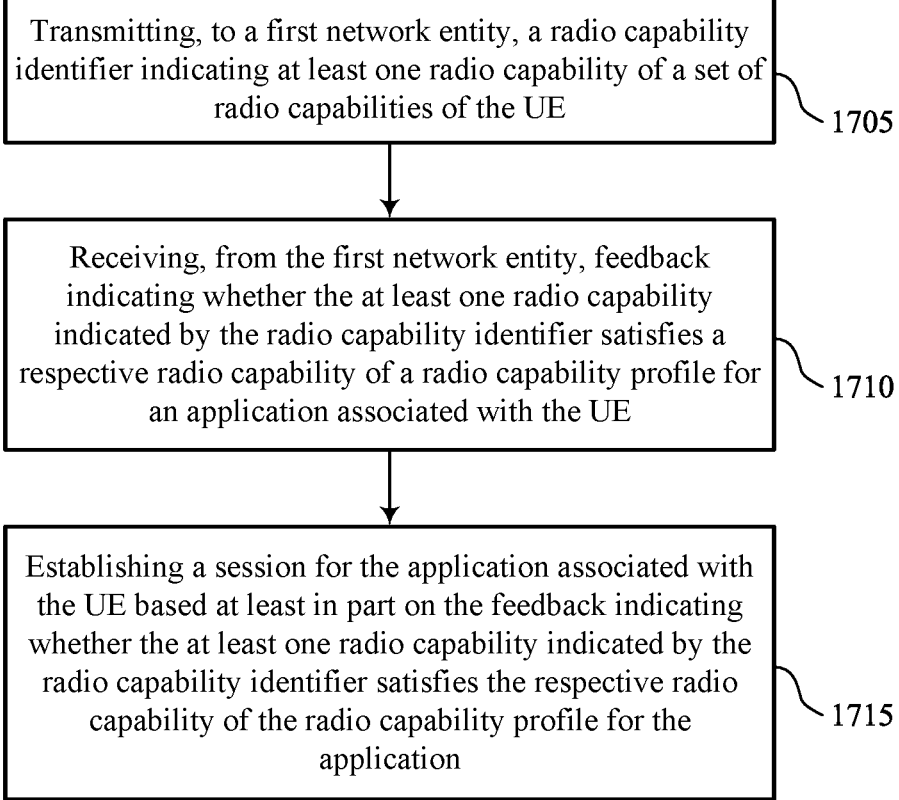

Transmitting, to a first network entity, a radio capability identifier indicating at least one radio capability of a set of radio capabilities of the UE ⌐1705

Receiving, from the first network entity, feedback indicating whether the at least one radio capability indicated by the radio capability identifier satisfies a respective radio capability of a radio capability profile for an application associated with the UE ⌐1710

Establishing a session for the application associated with the UE based at least in part on the feedback indicating whether the at least one radio capability indicated by the radio capability identifier satisfies the respective radio capability of the radio capability profile for the application ⌐1715

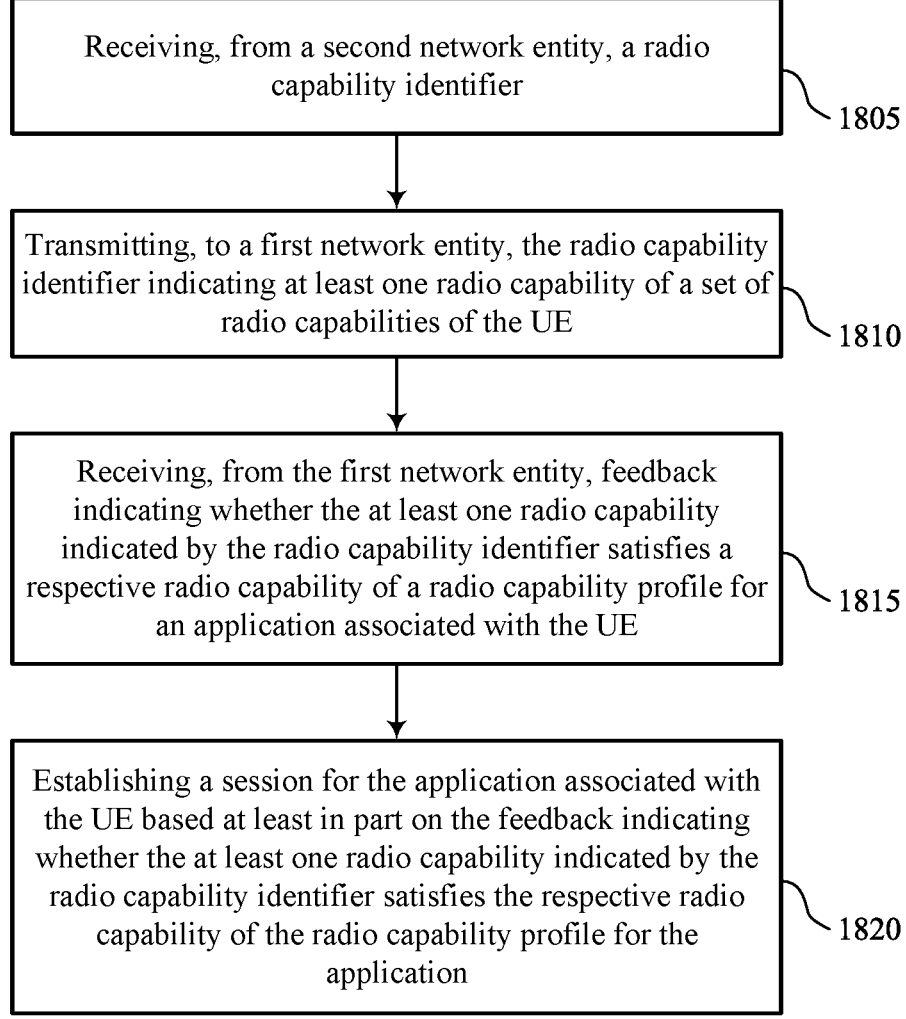

Receiving, from a second network entity, a radio capability identifier

⟋ 1805

Transmitting, to a first network entity, the radio capability identifier indicating at least one radio capability of a set of radio capabilities of the UE

⟋ 1810

Receiving, from the first network entity, feedback indicating whether the at least one radio capability indicated by the radio capability identifier satisfies a respective radio capability of a radio capability profile for an application associated with the UE

⟋ 1815

Establishing a session for the application associated with the UE based at least in part on the feedback indicating whether the at least one radio capability indicated by the radio capability identifier satisfies the respective radio capability of the radio capability profile for the application

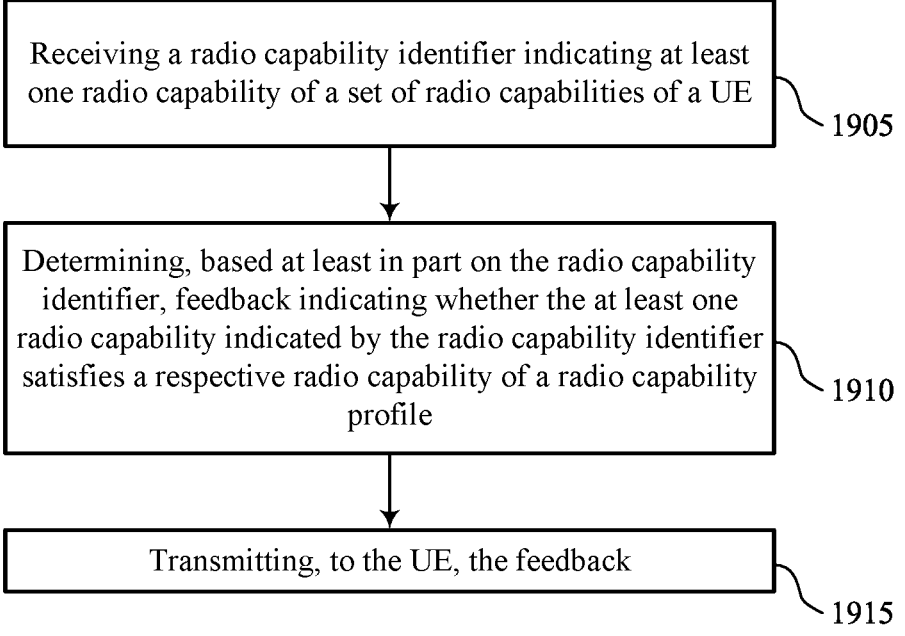

Receiving a radio capability identifier indicating at least one radio capability of a set of radio capabilities of a UE
1905

Determining, based at least in part on the radio capability identifier, feedback indicating whether the at least one radio capability indicated by the radio capability identifier satisfies a respective radio capability of a radio capability profile
1910

Transmitting, to the UE, the feedback
1915

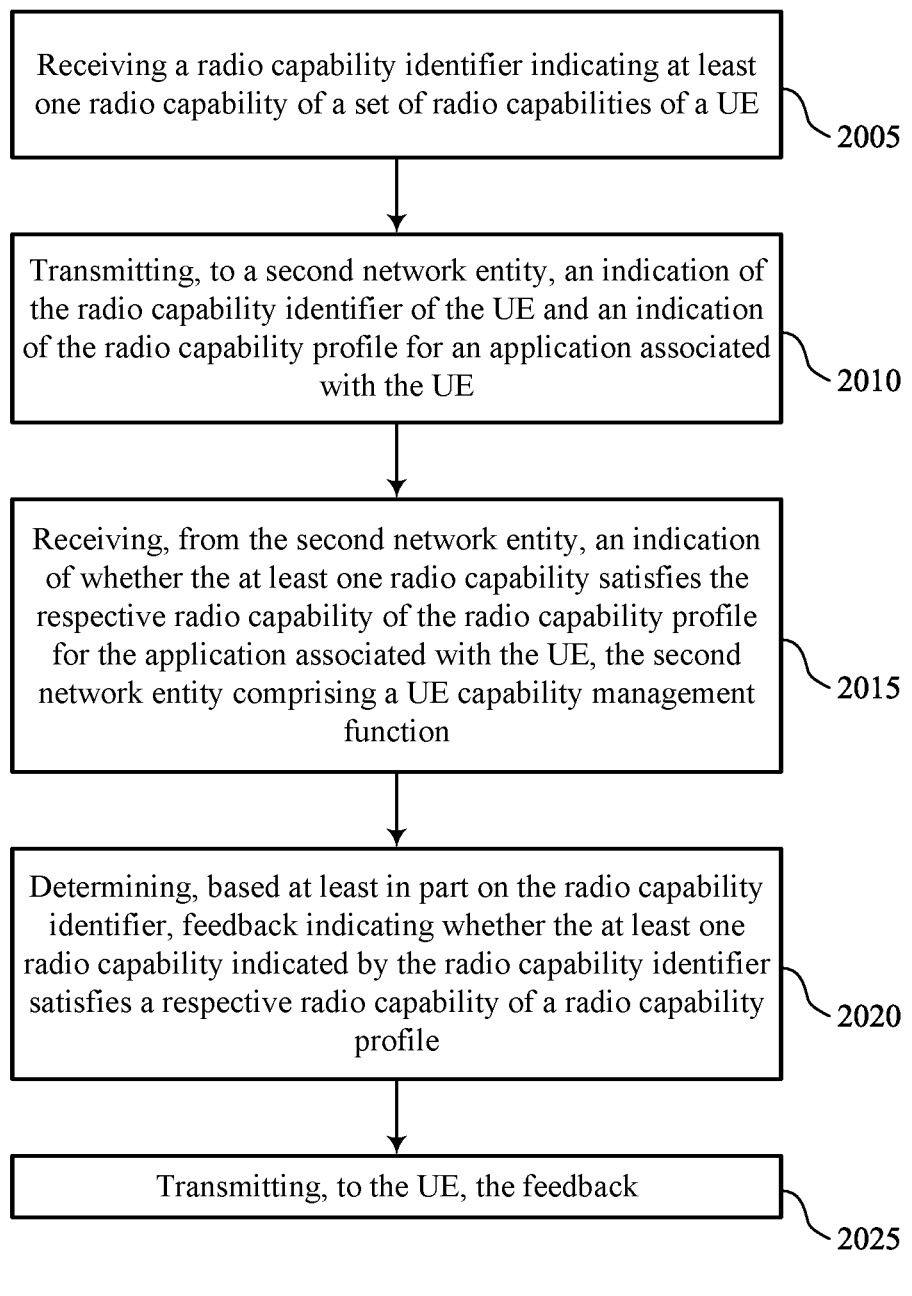

Receiving a radio capability identifier indicating at least one radio capability of a set of radio capabilities of a UE

2005

Transmitting, to a second network entity, an indication of the radio capability identifier of the UE and an indication of the radio capability profile for an application associated with the UE

2010

Receiving, from the second network entity, an indication of whether the at least one radio capability satisfies the respective radio capability of the radio capability profile for the application associated with the UE, the second network entity comprising a UE capability management function

2015

Determining, based at least in part on the radio capability identifier, feedback indicating whether the at least one radio capability indicated by the radio capability identifier satisfies a respective radio capability of a radio capability profile

2020

Transmitting, to the UE, the feedback

CAPABILITY SIGNALING

CROSS REFERENCES

The present Application is a 371 national stage filing of International PCT Application No. PCT/US2022/078916 by SPEICHER et al. entitled "CAPABILITY SIGNALING," filed Oct. 28, 2022; and claims priority to Greek Patent Application No. 20210100767 by SPEICHER et al. entitled "CAPABILITY SIGNALING," filed Nov. 3, 2021, each of which is assigned to the assignee hereof, and each of which is expressly incorporated by reference in its entirety herein.

FIELD OF TECHNOLOGY

The following relates to wireless communications, including capability signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support capability signaling. Generally, a communication device may transmit a radio capability identifier to a network entity. In some examples, the radio capability identifier may indicate a set of radio capabilities of the communication device. In response to receiving the radio capability identifier, the network entity may determine feedback indicating whether the set of radio capabilities indicated by the radio capability identifier satisfy a respective radio capability of a radio capability profile for an application associated with the communication device. The network entity may transmit the determined feedback to the communication device, and, in response, the communication device may establish a session for the application associated with the communication device. In some examples, network and radio capability signaling, as described herein, may manage resource utilization at the communication device and reduce network inefficiencies.

A method for wireless communication at a UE is described herein. The method may include transmitting, to a first network entity, a radio capability identifier indicating at least one radio capability of a set of radio capabilities of the UE, receiving, from the first network entity, feedback indicating whether the at least one radio capability indicated by the radio capability identifier satisfies a respective radio capability of a radio capability profile for an application associated with the UE, and establishing a session for the application associated with the UE based at least in part on the feedback indicating whether the at least one radio capability indicated by the radio capability identifier satisfies the respective radio capability of the radio capability profile for the application.

An apparatus for wireless communication at a UE is described herein. The apparatus may include a processor, and a memory coupled with the processor, with instructions stored in the memory. The instructions being executable by the processor to cause the apparatus to transmit, to a first network entity, a radio capability identifier indicating at least one radio capability of a set of radio capabilities of the UE, receive, from the first network entity, feedback indicating whether the at least one radio capability indicated by the radio capability identifier satisfies a respective radio capability of a radio capability profile for an application associated with the UE, and establish a session for the application associated with the UE based at least in part on the feedback indicating whether the at least one radio capability indicated by the radio capability identifier satisfies the respective radio capability of the radio capability profile for the application.

Another apparatus for wireless communication at a UE is described herein. The apparatus may include means for transmitting, to a first network entity, a radio capability identifier indicating at least one radio capability of a set of radio capabilities of the UE, means for receiving, from the first network entity, feedback indicating whether the at least one radio capability indicated by the radio capability identifier satisfies a respective radio capability of a radio capability profile for an application associated with the UE, and means for establishing a session for the application associated with the UE based at least in part on the feedback indicating whether the at least one radio capability indicated by the radio capability identifier satisfies the respective radio capability of the radio capability profile for the application.

A non-transitory computer-readable medium storing code for wireless communication at a UE is described herein. The code may include instructions executable by a processor to transmit, to a first network entity, a radio capability identifier indicating at least one radio capability of a set of radio capabilities of the UE, receive, from the first network entity, feedback indicating whether the at least one radio capability indicated by the radio capability identifier satisfies a respective radio capability of a radio capability profile for an application associated with the UE, and establish a session for the application associated with the UE based at least in part on the feedback indicating whether the at least one radio capability indicated by the radio capability identifier satisfies the respective radio capability of the radio capability profile for the application.

Some examples of the method, apparatuses, and non-transitory computer-readable medium described herein may further include operations, features, means, or instructions for receiving, from a second network entity, the radio capability identifier, where transmitting the radio capability identifier may be based at least in part on receiving, from the second network entity, the radio capability identifier.

Some examples of the method, apparatuses, and non-transitory computer-readable medium described herein may further include operations, features, means, or instructions for receiving, from the second network entity, a second radio capability identifier based at least in part on a change to one or more radio capabilities of the UE, the second radio capability identifier indicating that the one or more radio capabilities may be different, transmitting, to the first network entity, the second radio capability identifier, and receiving, from the first network entity, second feedback indicating whether the one or more radio capabilities indicated by the second radio capability identifier satisfies the respective radio capability of the radio capability profile for the application associated with the UE.

In some examples of the method, apparatuses, and non-transitory computer-readable medium described herein, the second network entity includes an access and mobility management function (AMF) or a mobility management entity (MME).

In some examples of the method, apparatuses, and non-transitory computer-readable medium described herein, the radio capability identifier indicates the at least one radio capability of the UE and a radio capability supported by a network serving the UE.

Some examples of the method, apparatuses, and non-transitory computer-readable medium described herein may further include operations, features, means, or instructions for receiving, from the second network entity, a radio capability filter associated with one or more radio capabilities supported by the network serving the UE and transmitting, to the second network entity, a second set of radio capabilities corresponding to the radio capability filter, where receiving, from the second network entity, the radio capability identifier may be based at least in part on transmitting, to the second network entity, the second set of radio capabilities corresponding to the radio capability filter.

In some examples of the method, apparatuses, and non-transitory computer-readable medium described herein, receiving the feedback may include operations, features, means, or instructions for receiving, from the first network entity, second feedback indicating that the at least one radio capability indicated by the radio capability identifier satisfies the respective radio capability of the radio capability profile for the application associated with the UE, the second feedback including a positive acknowledgement (ACK).

In some examples of the method, apparatuses, and non-transitory computer-readable medium described herein, receiving the feedback may include operations, features, means, or instructions for receiving, from the first network entity, second feedback indicating that the at least one radio capability indicated by the radio capability identifier fails to satisfy the respective radio capability of the radio capability profile for the application associated with the UE, the second feedback including a negative acknowledgement (NACK).

In some examples of the method, apparatuses, and non-transitory computer-readable medium described herein, the radio capability identifier may be stored in a memory at the UE.

In some examples of the method, apparatuses, and non-transitory computer-readable medium described herein, the first network entity includes an application function (AF).

A method for wireless communication at a first network entity is described herein. The method may include receiving a radio capability identifier indicating at least one radio capability of a set of radio capabilities of a UE, determining, based at least in part on the radio capability identifier, feedback indicating whether the at least one radio capability indicated by the radio capability identifier satisfies a respective radio capability of a radio capability profile, and transmitting, to the UE, the feedback.

An apparatus for wireless communication at a first network entity is described herein. The apparatus may include a processor, and a memory coupled with the processor, with instructions stored in the memory. The instructions being executable by the processor to cause the apparatus to receive a radio capability identifier indicating at least one radio capability of a set of radio capabilities of a UE, determine, based at least in part on the radio capability identifier, feedback indicating whether the at least one radio capability indicated by the radio capability identifier satisfies a respective radio capability of a radio capability profile, and transmit, to the UE, the feedback.

Another apparatus for wireless communication at a first network entity is described herein. The apparatus may include means for receiving a radio capability identifier indicating at least one radio capability of a set of radio capabilities of a UE, means for determining, based at least in part on the radio capability identifier, feedback indicating whether the at least one radio capability indicated by the radio capability identifier satisfies a respective radio capability of a radio capability profile, and means for transmitting, to the UE, the feedback.

A non-transitory computer-readable medium storing code for wireless communication at a first network entity is described herein. The code may include instructions executable by a processor to receive a radio capability identifier indicating at least one radio capability of a set of radio capabilities of a UE, determine, based at least in part on the radio capability identifier, feedback indicating whether the at least one radio capability indicated by the radio capability identifier satisfies a respective radio capability of a radio capability profile, and transmit, to the UE, the feedback.

In some examples of the method, apparatuses, and non-transitory computer-readable medium described herein, determining the feedback may include operations, features, means, or instructions for transmitting, to a second network entity, an indication of the radio capability identifier of the UE and an indication of the radio capability profile for an application associated with the UE and receiving, from the second network entity, an indication of whether the at least one radio capability satisfies the respective radio capability of the radio capability profile for the application associated with the UE, the second network entity including a UE capability management function.

In some examples of the method, apparatuses, and non-transitory computer-readable medium described herein, receiving the radio capability identifier indicating the at least one radio capability of the set of radio capabilities of the UE may include operations, features, means, or instructions for receiving, from the UE, the radio capability identifier, where determining the feedback may be based at least in part on receiving, from the UE, the radio capability identifier.

Some examples of the method, apparatuses, and non-transitory computer-readable medium described herein may further include operations, features, means, or instructions for receiving, from the UE, a second radio capability identifier indicating one or more radio capabilities that may be different, determining, based at least in part on the second radio capability identifier, second feedback indicating whether the one or more radio capabilities indicated by the second radio capability identifier satisfy the respective radio capability of the radio capability profile for an application associated with the UE, and transmitting, to the UE, the second feedback.

In some examples of the method, apparatuses, and non-transitory computer-readable medium described herein, receiving the radio capability identifier indicating the at least one radio capability may include operations, features, means, or instructions for transmitting, to a second network entity, a request for the radio capability identifier and receiving, from the second network entity, the radio capability identifier, the second network entity including an AMF or an MME.

Some examples of the method, apparatuses, and non-transitory computer-readable medium described herein may further include operations, features, means, or instructions for transmitting, to the UE, second feedback indicating that the at least one radio capability indicated by the radio capability identifier satisfies the respective radio capability of the radio capability profile for an application associated with the UE, the second feedback including an ACK.

Some examples of the method, apparatuses, and non-transitory computer-readable medium described herein may further include operations, features, means, or instructions for transmitting, to the UE, second feedback indicating that the at least one radio capability indicated by the radio capability identifier does not satisfy the respective radio capability of the radio capability profile for an application associated with the UE, the second feedback including a NACK.

In some examples of the method, apparatuses, and non-transitory computer-readable medium described herein, the first network entity includes an AF.

BRIEF DESCRIPTION OF THE DRAWINGS

FIG. 7 illustrates an example of a method that supports capability signaling in accordance with aspects of the present disclosure.

FIG. 11 shows a block diagram of a communications manager that supports capability signaling in accordance with aspects of the present disclosure.

FIGS. 17 through 20 show flowcharts illustrating methods that support capability signaling in accordance with aspects of the present disclosure.

DETAILED DESCRIPTION

Figure 1:
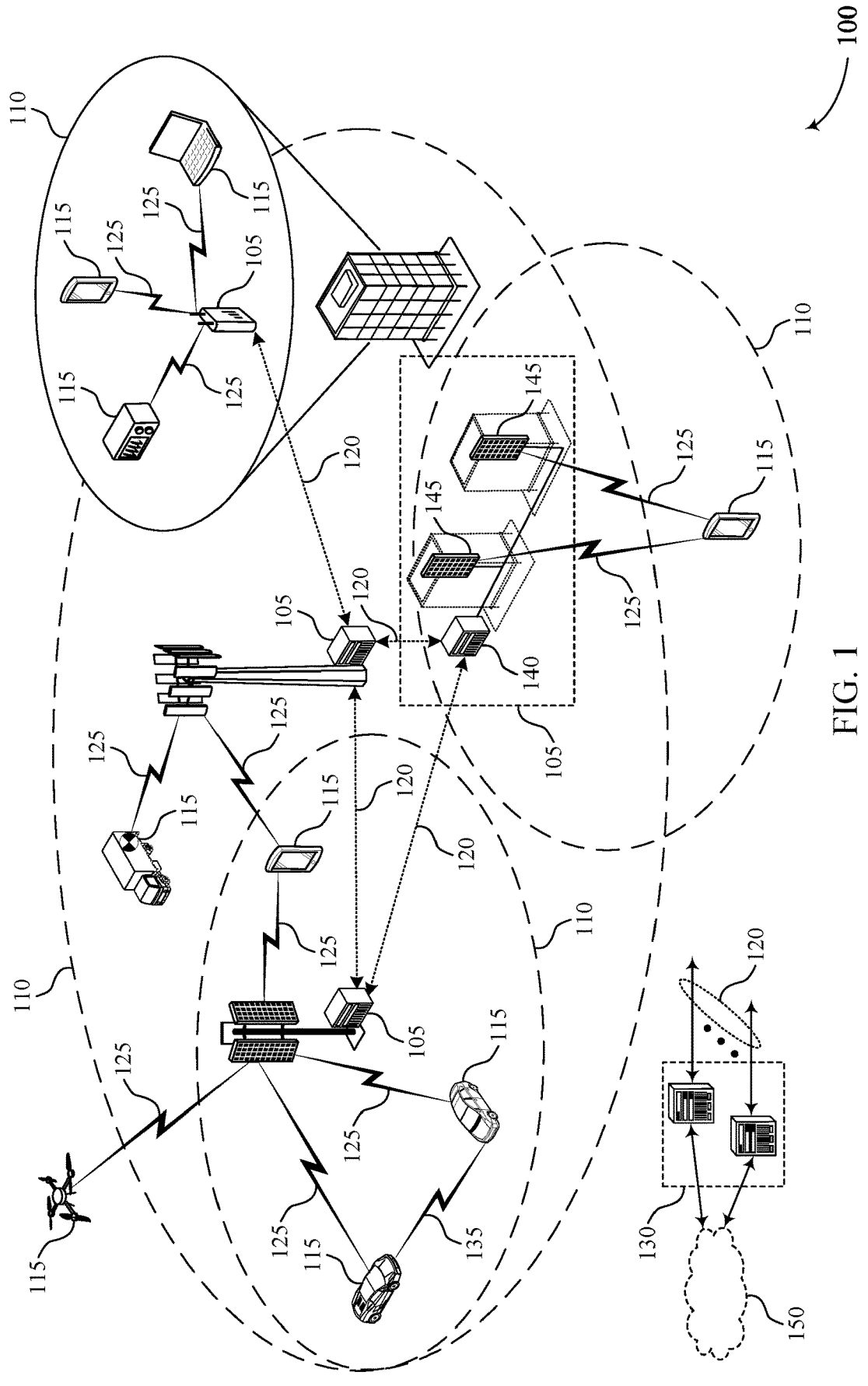
FIGS. 1 and 2 each illustrate an example of a wireless communications system that supports capability signaling in accordance with aspects of the present disclosure.

A communication device (e.g., a UE) may support multiple radio capabilities, such as 4G (e.g., LTE capabilities), 5G (e.g., NR capabilities), and the like. The communication device may support various applications, such as low latency applications or high reliability applications. In some cases, the communication device may support an application associated with various frequency band combinations. In some other cases, the communication device may support an application associated with time synchronization. The communication device supporting some applications may depend on radio capabilities of the communication device, as well as radio capabilities of the network servicing the communication device. For example, upon initialization of an application by the communication device, the application may operate in accordance with a set of parameters to achieve a performance level (e.g., a frequency band combination, a time synchronization accuracy). In some cases, the communication device may not support one or more radio capabilities associated with the set of parameters of the application to operate properly at the performance level.

A communication device may continue to execute an application as if the communication device is capable of supporting some radio capabilities. For example, if an application uses propagation delay compensation (PDC), but the communication device or radio access network (RAN) does not support PDC, the application may continue to operate as if PDC is functioning properly (i.e., is supported). As a result, the application may not operate properly at a desired performance level or may operate with inaccurate data. In some other examples, the application may identify insufficient support for one or more radio capabilities, for example, based at least in part on measurements performed by the application or metrics reported to the application by the communication device. In such examples, the application may determine to operate with a different set of parameters which may be supported by the communication device. That is, the application may switch operating parameters which may result in inefficient use of resources available to the communication device. Additionally, or alternatively, the different set of operating parameters may be associated with a reduced performance level of the application, resulting in reduced throughput and increased latency.

Various aspects of the present disclosure relate to techniques for matching the radio capabilities of a communication device (e.g., and the network in which the communication device is operating in) with the radio capabilities associated with a performance level of an application. For example, prior to an initialization of an application by the communication device, the communication device may transmit a radio capability identifier, such as a UE radio capability identifier (URCID), to a network entity. In some examples, such a network entity may be referred to as an application function (AF). The URCID may correspond to a set of radio capabilities supported by the communication device as well as the network that is servicing the communication device. The AF may transmit a match request to a network function which maps radio capability identifiers (e.g., URCIDs) to one or more radio capabilities. Such a network function may be referred to as a UE radio capability management function (UCMF).

The match request transmitted by the AF may include a radio capability identifier (e.g., a URCID) associated with the communication device and one or more application profile identifiers. The application profile identifiers may each be associated with a different level of operating performance by the application. The URCID and the application profile identifiers may each correspond to a set of radio capabilities stored in the UCMF. The UCMF may determine whether the set of radio capabilities associated with each application profile identifier match the radio capabilities associated with the URCID of the communication device That is, the UCMF may determine whether the communication device may support the radio capabilities associated with each of the application profile identifiers and, accordingly, whether the communication device may support a performance level of the application. In some examples, the UCMF may transmit feedback to the AF for each application profile identifier included in the match request. The AF may transmit (e.g., forward) the feedback to the application and the application may use the feedback to determine a set of operating parameters supported by the communication device and the network. In some examples, determining whether the radio capabilities associated with a desired performance level of an application may increase resource utilization at the communication device and reduce network inefficiencies.

Aspects of the subject matter described herein may be implemented to realize one or more of the following potential improvements, among others. The techniques employed by the communication device may provide benefits and enhancements to the operation of the communication device and promote network efficiencies. For example, capability signaling may increase resource utilization at the communication device. In some other examples, capability signaling may provide improvements to latency, power consumption, and, in some examples, may promote highly reliable communications, among other benefits.

Aspects of the present disclosure are initially described in the context of wireless communications systems. Aspects of the disclosure are then described in the context of core network functions in a wireless communications system, process flows, and radio capability signaling procedures. Aspects of the disclosure are further illustrated by and described with reference to apparatus diagrams, system diagrams, and flowcharts that relate to capability signaling.

FIG. 1 illustrates an example of a wireless communications system 100 that supports capability signaling in accordance with aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and Ne may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A base station 105 may be movable and therefore provide communication coverage for a geographic coverage area that may be changing, for example, a coverage area 110. In some examples, different coverage areas 110 associated with different technologies may overlap, but the different coverage areas 110 may be supported by the same base station 105. In other examples, the overlapping coverage areas 110 associated with different technologies may be supported by different base stations 105. The wireless communications system 100 may include, for example, a heterogeneous network in which different types of the base stations 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

A UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the coverage area 110 of a base station 105. Other UEs 115 in such a group may be outside the coverage area 110 of a base station 105 or be otherwise unable to receive transmissions from a base station 105. In some examples, groups of the UEs 115 communicating via D2D communications may utilize a one-to-many (1: M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based at least in part on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A UE 115 may transmit a radio capability identifier (e.g., a URCID) to a network entity (e.g., a base station 105). The network entity may be associated with the core network 130. In some examples, the URCID may indicate a set of radio capabilities of the UE 115. In response to receiving the radio capability identifier, the network entity may determine feedback indicating whether the one or more radio capabilities indicated by the radio capability identifier satisfy a respective radio capability of a radio capability profile for an application associated with the UE 115. The network entity may transmit the determined feedback to the UE 115. In response to receiving the feedback, the UE 115 may establish a session for the application associated with the UE 115. As described herein, signaling the radio capabilities of the network and the UE 115 may promote network efficiencies.

Figure 2:
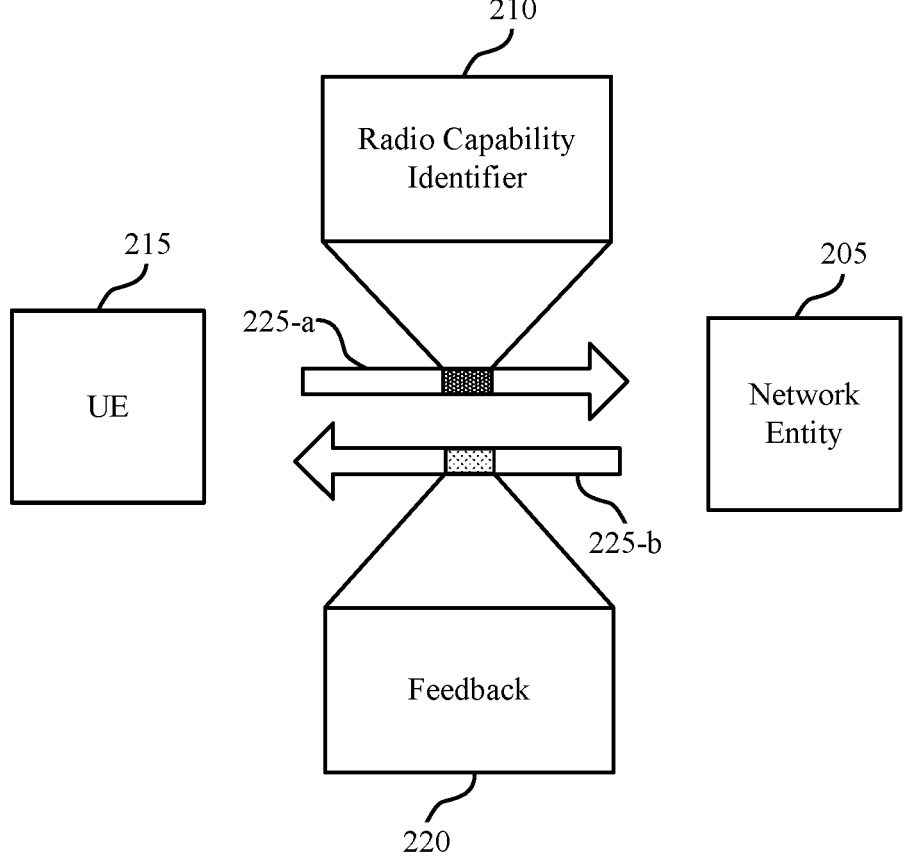

FIG. 2 illustrates an example of a wireless communications system 200 that supports capability signaling in accordance with aspects of the present disclosure. In some examples, the wireless communications system 200 may implement or be implemented by aspects of the wireless communications system 100. For example, the wireless communications system 200 may include a UE 215, which may be an example of a UE 115 as described herein with reference to FIG. 1. The wireless communications system 200 may also include a network entity 205, which may be an entity associated with a core network 130 described herein with reference to FIG. 1. In the example of FIG. 2, the network entity 205 may be an example of a network function, such as an AF. The network entity 205 may be physically located at various locations in a core network 130, including being distributed such that sub-components are implemented at different physical locations by one or more physical components. The UE 215 and the network entity 205 may communicate via one or more interfaces 225 and through one or more other network entities, such as an AMF.

The wireless communications system 200 may support one or more radio access technologies (RATs) including 4G systems such as LTE systems, LTE-A systems, or LTE-A Pro systems, 5G systems which may be referred to as NR systems, or a combination of these or other RATs, to connect to a network (e.g., a core network). In some examples, the viability of a particular application and the actions that an AF may perform may depend on the alignment of radio features deployed in network and the UE operating within the network. In some examples, the AF may operate internally to the network as part of a control plane function group. In such examples, the AF may directly communicate with other network functions. In some other examples, the AF may operate externally to the network and may communicate with other network functions, such as the AMF, via a network exposure function (NEF).

In some examples, the network (e.g., a public land mobile network (PLMN) or standalone non-public network (SNPN)) may deploy a sub-set of the available radio features and the UE operating within that network may or may not support the radio capabilities to operate such features. Therefore, an AF may not know (e.g., prior to the initialization of a session for a particular application) whether the radio features of the application align (e.g., match) with the radio features of the UE (e.g., and the network). Stated alternatively, the AF may not know whether there is alignment of radio features that would be used to support the application or particular functions of the application. Radio features that may be used by an AF to support an application may include PDC, URLLC radio features or particular band combinations (e.g., mmW bands), among other examples. For example, an application may determine whether to set up high definition (HD) video (e.g., with 8,000-pixel (8 k) resolution) or standard definition (SD) video based on the particular band combination supported by the UE and network servicing the UE.

As an illustrative example, an AF may use time synchronization with a particular accuracy that may be supported by a particular radio capability, such as PDC. Thus, fulfilment of a request by the AF for time synchronization with a particular accuracy may depend on whether a UE and a RAN node (e.g., a base station) serving the UE support PDC. Stated alternatively, whether a request by the AF for time synchronization with a relatively high accuracy may be fulfilled by the system (e.g., the wireless communications system) may depend on whether a UE and a RAN node serving the UE support PDC or not. However, in some examples, an AF (e.g., or other core network functions) may be unable to determine whether a UE and a RAN node serving the UE support PDC or not. Thus, the AF may not know whether time synchronization provided to the application is of the requested accuracy. In some cases, if the time synchronization provided to the application is not of the requested accuracy, the performance level of the application may be reduced, resulting in network inefficiencies.

Therefore, to improve network efficiency, the wireless communications system 200 may support matching the radio capabilities of the UE 215 and the network servicing the UE 215 with the radio capabilities associated with a desired performance level of an application. For example, the UE 215 may transmit a radio capability identifier to the network entity 205 (e.g., an AF). The radio capability identifier (e.g., a radio capability identifier 210) may indicate at least one radio capability of the UE 215. In response to receiving the radio capability identifier 210, the network entity 205 may determine feedback (e.g., feedback 220) indicating whether the one or more radio capabilities indicated by the radio capability identifier 210 satisfy (e.g., match) a respective radio capability of a radio capability profile for the application associated with the UE 215. The network entity 205 may transmit the feedback 220 to the UE 215. In response to receiving the feedback 220, the UE 215 may establish a session for the application associated with the UE 215. In some examples, determining whether the radio capabilities associated with a desired performance level of an application may increase resource utilization at the UE 215 and network inefficiencies may be reduced.

Figure 3A:
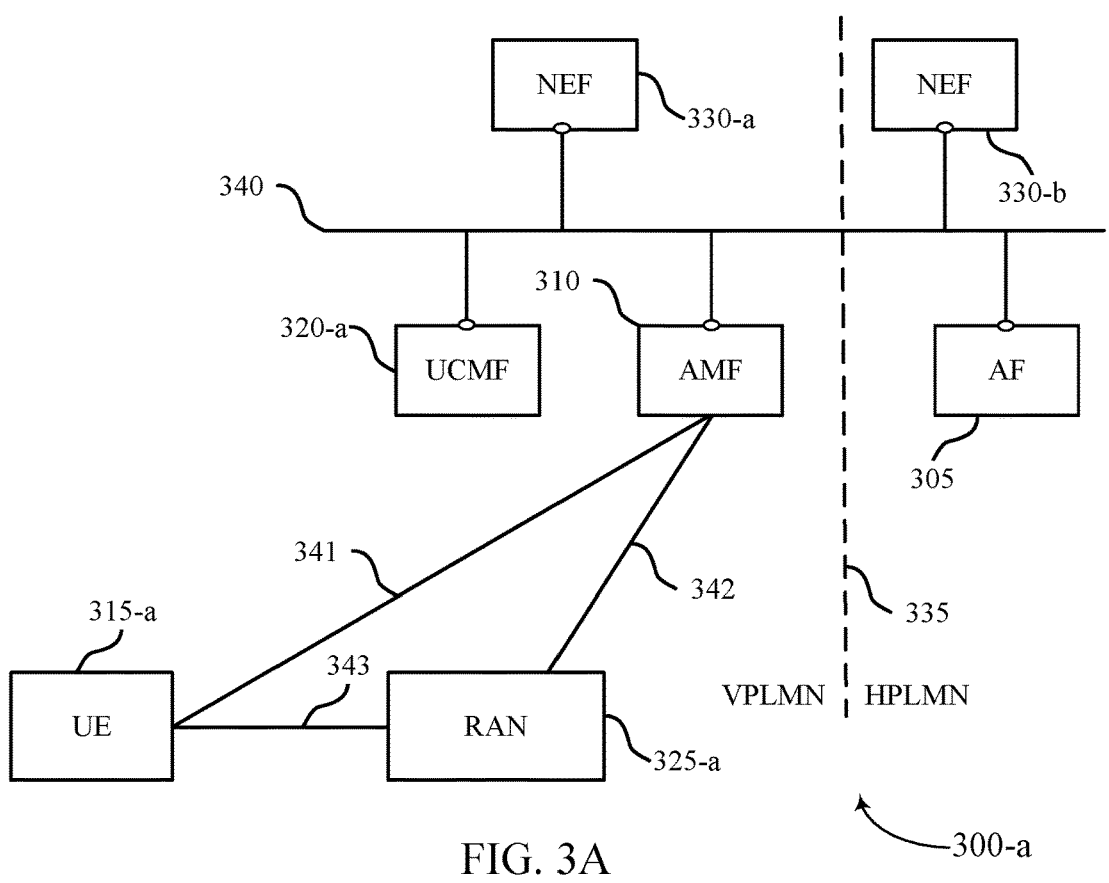
FIGS. 3A and 3B each illustrate an example of core network functions in a wireless communications system that supports capability signaling in accordance with aspects of the present disclosure.
Figure 3B:
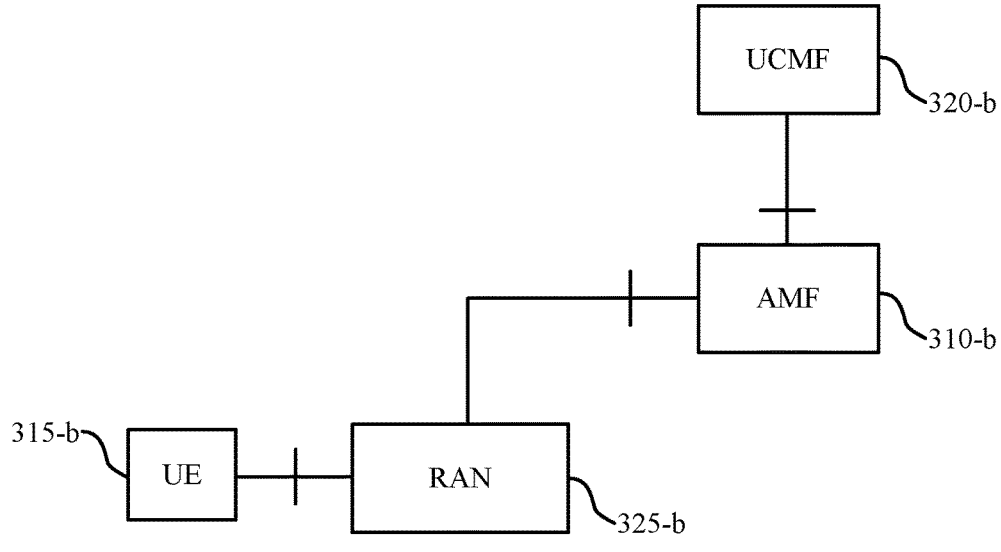

FIG. 3A illustrates an example of core network functions in a wireless communications system 300-*a* that supports capability signaling in accordance with aspects of the present disclosure, and FIG. 3B illustrates an example of core network functions in a wireless communications system 300-*b* that supports capability signaling in accordance with aspects of the present disclosure. In some examples, the wireless communications systems 300-*a* and 300-*b* may implement or be implemented by one or more aspects of the wireless communications systems 100 and 200. For instance, each wireless communications system 300 may include a UE 315 (e.g., a UE 315-*a* and a UE 315-*b*, respectively), which may be an example of the corresponding device described herein with reference to FIG. 1. The wireless communications systems 300 may each include a RAN node (e.g., a RAN node 325-*a* and a RAN node 325-*b*, respectively) which may be an example of a base station 105 described herein with reference to FIG. 1.

The wireless communications system 300-*a* may also include one or more network functions, such as an AMF 310-*a*, a UCMF 320-*a*, an AF 305, and a NEF 335 (e.g., a NEF 335-*a* and a NEF 335-*b*). The AF 305 may be an example of a network entity described herein with reference to FIG. 2. Each of the network functions included in the wireless communications system 300-*a* may be in communication with one another via one or more network interfaces 340, which may be examples of service-based interfaces. The UE 315-*a* may communicate with one or more network functions via an interface 341 (e.g., an N1 interface) and the RAN node 325-*a* may communicate with one or more network functions via an interface 342 (e.g., an N2 interface). The UE 315-*a* and the RAN node 325-*a* may communicate via an interface 343, which may be an example of a Uu interface.

The wireless communications system 300-*b* may also include one or more network functions, for example a UCMF 320-*b* and an AMF 310-*b*. In some examples, the actions performed by the AMFs 310 may be performed by an MME, not shown. One or more of the network functions included in the wireless communications system 300-*a* and the wireless communications system 300-*b* may be physically located at various locations in a core network 130 described herein with reference to FIG. 1. The wireless communications system 300-*a* and the wireless communications system 300-*b* may each include other network functions or devices not shown, or may each exclude one or more of the network functions or devices shown. In the example of FIG. 3A, the wireless communications system 300-*a* may be an example of a roaming architecture where the UE 315-*a* may establish a connection with a visiting public land area network (VPLMN) that may be a same PLMN or a different PLMN than the home public land mobile network (HPLMN).

In some examples, the wireless communications systems 300 may support radio capability signaling optimization (RACS) where radio capabilities of a UE (e.g., the UE 315-*a* or the UE 315-*b*) may be signaled between the UEs 315 and one or more network entities (e.g., network functions). The signaled radio capabilities may be encoded (e.g., abstract syntax one (ASN. 1) encoded). However, in some examples, one or more control network nodes (e.g., network functions) may not read encoded radio capabilities of the UEs 315. Therefore, the network functions may not manipulate (e.g., change) the radio capabilities at the UEs 315. In some examples, however, RACS may feature a UCMF (e.g., the UCMF 320-*a* and the UCMF 320-*b*) which may store radio capability identifier mappings (e.g., URCID mappings) in a PLMN and, as such, may assign URCIDs (e.g., PLMN-assigned URCIDs) in the PLMN. The UCMFs 320 may each store the URCIDs as well as (e.g., alongside) the radio capability information the URCIDs are mapped to.

Each URCID stored in the UCMFs 320 may be associated with one or more radio capability formats (e.g., UE radio capability formats). In some examples, one or more of the UE radio capabilities formats may be identifiable by the AMFs 310 (e.g., or an MME, not shown) and the UCMFs 320. In such examples, the RAN nodes 325 (e.g., the RAN node 325-*a* and the RAN node 325-*b*) operating in the wireless communications systems 300 (e.g., an evolved packet system or a fifth generation system (5GS)) may be configured such that the UCMFs 320 may be capable to transcode between multiple capability formats. To perform the transcoding, the UCMFs 320 may, for example, read each of the radio capability formats participating in the transcoding. Stated alternatively, the UCMFs 320 may be capable of reading, and thus transcoding, multiple radio capability formats. In some cases, the UCMFs 320 may use transcoding to match one or more radio capabilities indicated by a radio capability identifier (e.g., a radio capability identifier described herein with reference to FIG. 2) with a respective radio capability of a radio capability profile for the application associated with a UE (e.g., the UE 315-*a* or the UE 315-*b*). In some other examples, the UCMFs 320 may determine whether the one or more radio capabilities indicated by a radio capability identifier match (e.g., satisfy) a respective radio capability of a radio capability profile for the application associated with the UEs 315. RACS may be further described herein with respect to FIGS. 4A and 4B.

Figure 4A:
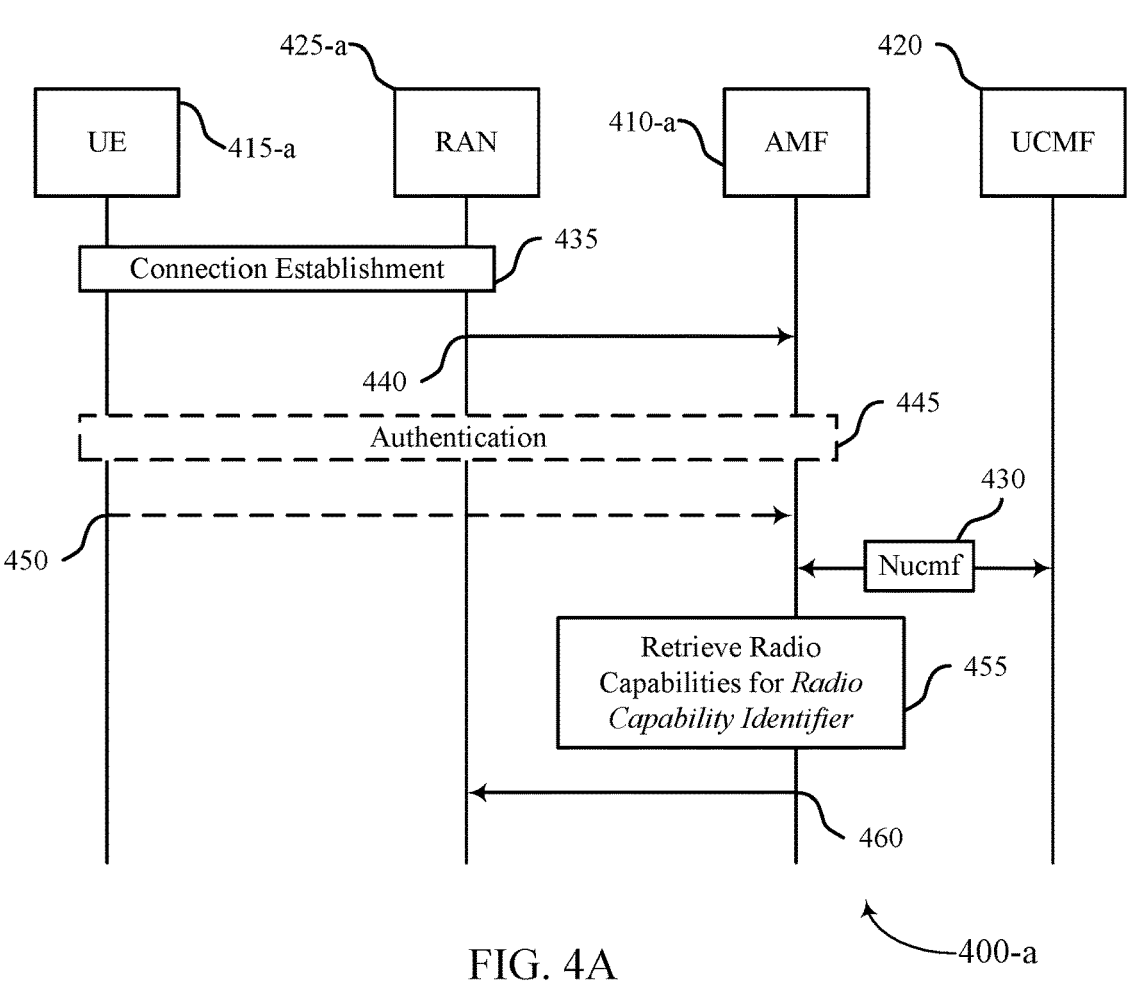
FIGS. 4A and 4B each illustrate an example of a process flow that supports capability signaling in accordance with aspects of the present disclosure.
Figure 4B:
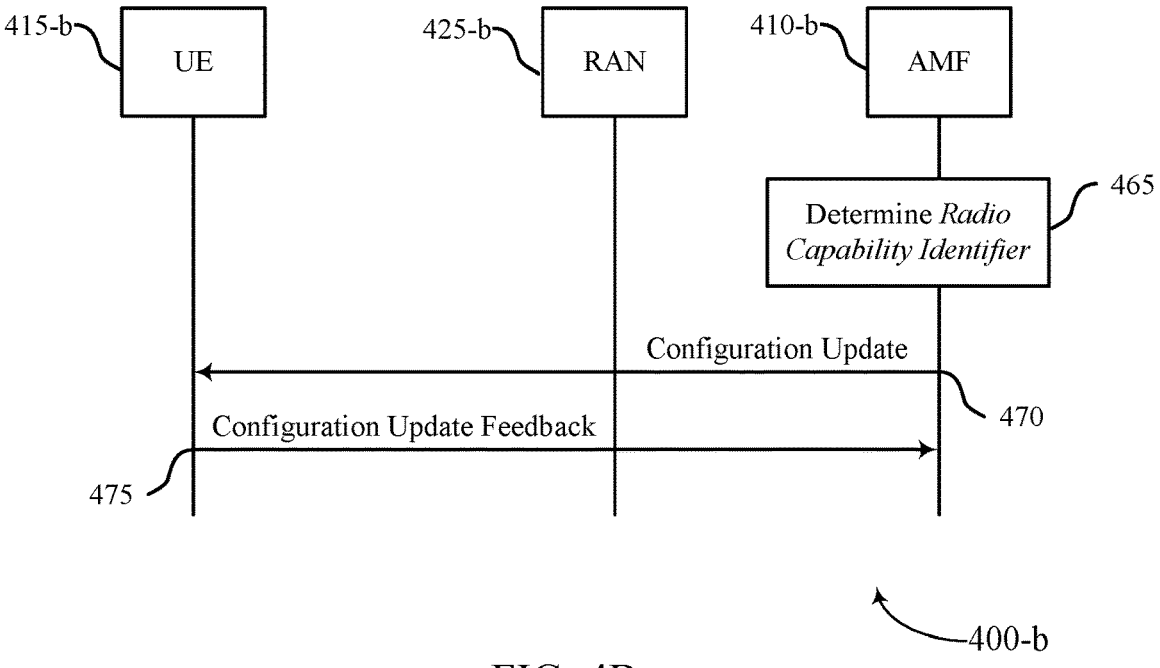

FIG. 4A illustrates an example of a process flow 400-*a* that supports capability signaling in accordance with aspects of the present disclosure, and FIG. 4B illustrates an example of a process flow 400-*b* that supports capability signaling in accordance with aspects of the present disclosure. In some examples, the process flows 400-*a* and 400-*b* may implement or be implemented by one or more aspects of the wireless communications systems 100, 200, 300-*a*, and 300-*b* described herein with respect to FIGS. 1, 2, 3A, and 3B, respectively. The process flows 400-*a* and 400-*b* may be based at least in part on a configuration by a RAN node 425 (e.g., a RAN node 425-*a* or a RAN node 425-*b*) and implemented by a UE 415 (e.g., a UE 415-*a* or a UE 415-*b*) to promote network efficiencies by supporting network and UE radio capability signaling, as described herein. The process flows 400-*a* and 400-*b* may also be based at least in part on a configuration by the RAN nodes 425 and implemented by the UEs 415 to promote high reliability and low latency operations, among other benefits. In the following description of the process flows 400-*a* and 400-*b*, the operations between the UEs 415, the RAN nodes 425, and AMFs 410 (e.g., an AMF 410-*a* and an AMF 410-*b*) may be transmitted in a different order than the example order shown, or the operations performed by the UEs 415, the RAN nodes 425, and the AMFs 410 may be performed in different orders or at different times. Some operations may also be omitted.

In some examples, radio capability identifiers (e.g., URC-IDs) may be preconfigured at a UE by a UE manufacturer (e.g., may be manufacture-assigned) or, in some other examples, may assigned by a PLMN in accordance with RACS. For example, a URCID may be assigned by the UE manufacturer and stored in a memory at the UE. In some cases, the URCID stored at the UE may be accompanied by (e.g., may be stored with) UE manufacturer information, such as a tracking area code (TAC) field in the permanent equipment identifier (PEI). In such cases, the URCID may identify a set of radio capabilities for the respective manufacturer and, together with the UE manufacturer information, may identify a set of radio capabilities (e.g., UE radio capabilities) in a PLMN. For example, the radio capabilities associated with the manufacturer-assigned URCID may be stored in the UCMF and, as such, the UE may provide the manufacturer-assigned URCID to the UCMF (e.g., via a NAS). The UCMF may resolve (e.g., determine) the radio capabilities associated with the UE (e.g., based at least in part on the manufacturer-assigned URCID), for example when a RAN (e.g., the RAN node 425-*a*) requests the radio capabilities of a UE (e.g., the UE 415-*a*) from a UCMF (e.g., the UCMF 420).

In another example, a manufacturer assigned URCID may not be used by a UE (e.g., or the serving network) or may not be recognized by a UCMF of the serving PLMN. In such an example, the UCMF (e.g., the UCMF 420) may allocate a URCID for the UE 415-*a*. Stated alternatively, the UCMF 420 may assign a handler (e.g., a URCID) to the radio capabilities associated with the UE 415-*a* and signal the URCID (e.g., the PLMN-assigned URCID) to the UE 415-*a* via the NAS. In some cases, the PLMN-assigned URCID may correspond to a set of radio capabilities signaled to the PLMN by the UE 415-*a*. For example, the UCMF 420 may allocate different URCIDs for the UE 415-*a* corresponding to different sets of radio capabilities (e.g., UE radio capabilities) that the PLMN may receive from the UE 415-*a* at different times. In such an example, a URCID received by the UE 415-*a* may be applicable to the serving PLMN and may identify a corresponding set of radio capabilities supported by the PLMN.

In some examples, if the UE 415-*a* is assigned with PLMN-specific URCIDs for the serving PLMN, the UE 415-*a* may use the PLMN-specific URCIDs, otherwise the UE 415-*a* may use the manufacturer-assigned URCID. In some examples, the UE 415-*a* (e.g., and the PLMN which assigned the URCIDs) may store a number (e.g., 16) of different PLMN-assigned URCIDs. In some cases, the PLMN-assigned URCIDs may correspond to different configurations for a same PLMN or different URCIDs for different PLMNs (e.g., in the case of roaming). Additionally, or alternatively, the PLMN may also store the local configuration of the UE 415-*a* at the time of assignment. In some examples, the UE 415-*a* may store a mapping between the URCID and the corresponding radio capability information for each URCID stored at the UE 415-*a*. For example, the radio capabilities of the UE 415-*a* may change (e.g., upon a change in the usage settings of the UE 415-*a*) over time and, as such, the UE 415-*a* may signal (e.g., to the network) a different URCID (e.g., if available) associated with the radio capabilities supported by the UE 415-*a* at a given time.

As an illustrative example, the UE 415-*a* and the RAN node 425-*a* may establish a connection (e.g., a radio resource control (RRC) connection) at 435. At 440, the RAN node 425-*a* may signal a registration request to an AMF (e.g., the AMF 410-*a*). In some examples, the registration request may indicate a registration type, such as an initial registration, a mobility registration update, a periodic registration update, or an emergency registration update. In response, the UE 415-*a* may be authenticated by the network at 445. The UE 415-*a* may transmit a URCID to the AMF 410-*a*, for example, at 450 via the NAS. In some examples, the UE 415-*a* may transmit the URCID as part of an attach procedure (e.g., while operating in a mode, such as an S1 mode) or as part of a tracking area update (TAU) procedure (e.g., for inter-PLMN mobility). In some cases, the UE 415-*a* may send the URCID ciphered and, as such, a network function (e.g., the AMF 410-*a* or an MME not shown) may retrieve the URCID from the UE 415-*a* in a session management context (SMC) acknowledgement (e.g., a SMC Accept) sent from the UE 415-*a* to the AMF 410-*a*. In some other cases, the UE 415-*a* may signal the URCID as part of a registration request (e.g., for initial registration and inter-PLMN mobility), for example while operating in a mode, such as an N1 mode.

At 455, the AMF 410-*a* may retrieve one or more radio capabilities for a radio capability identifier (e.g., associated with the URCID) from the UCMF 420, for example via a service-based interface (e.g., Nucmf 430). In some examples, the URCID may be assigned as part of a globally unique temporary identifier (GUTI) re-allocation procedure, for example while operating in a mode, such as an S1 mode. In some other examples, the URCID may be assigned as part of a TAU acknowledgment (e.g., a TAU Accept), for example while operating in a mode, such as an N1 mode. In some other cases, the URCID may be assigned as part of a UE configuration update (UCU) procedure or a registration acknowledgement (e.g., a Registration Accept). In some examples, the network may use RACS to signal a URCID to the UE 415-*a* (e.g., via N2 or S1 signaling) whether the UE 15-*a* supports RACS or otherwise. At 460, the AMF 410-*a* may transmit the URCID to the UE 415-*a*, for example as part of an initial context setup request.

In some examples, the radio capabilities of a UE or the network servicing the UE may change, for example due to the UE disabling one or more radio capabilities, changing connections from one radio access technology to another radio access technology (e.g., with different radio capabilities), or moving to a location such that the radio capabilities of the network in the current location of the UE are different from the radio capabilities of the network in a previous location of the UE. In such an example, as illustrated in FIG. 4B, the AMF 410-*b* may send a URCID (e.g., an updated URCID) to the UE 415-*b*. For example, at 465, the AMF 410-*b* may determine a radio capability identifier (e.g., an updated URCID corresponding to the different radio capabilities of the UE 415-*b*) for the UE 415-*b*. At 470, the AMF 410-*b* may transmit the URCID to the UE 415-*b*, for example as part of a configuration update. At 475, the UE 415-*b* may transmit configuration update feedback to the AMF 410-*b*, for example in response to receiving the configuration update including the updated URCID.

Figure 5:
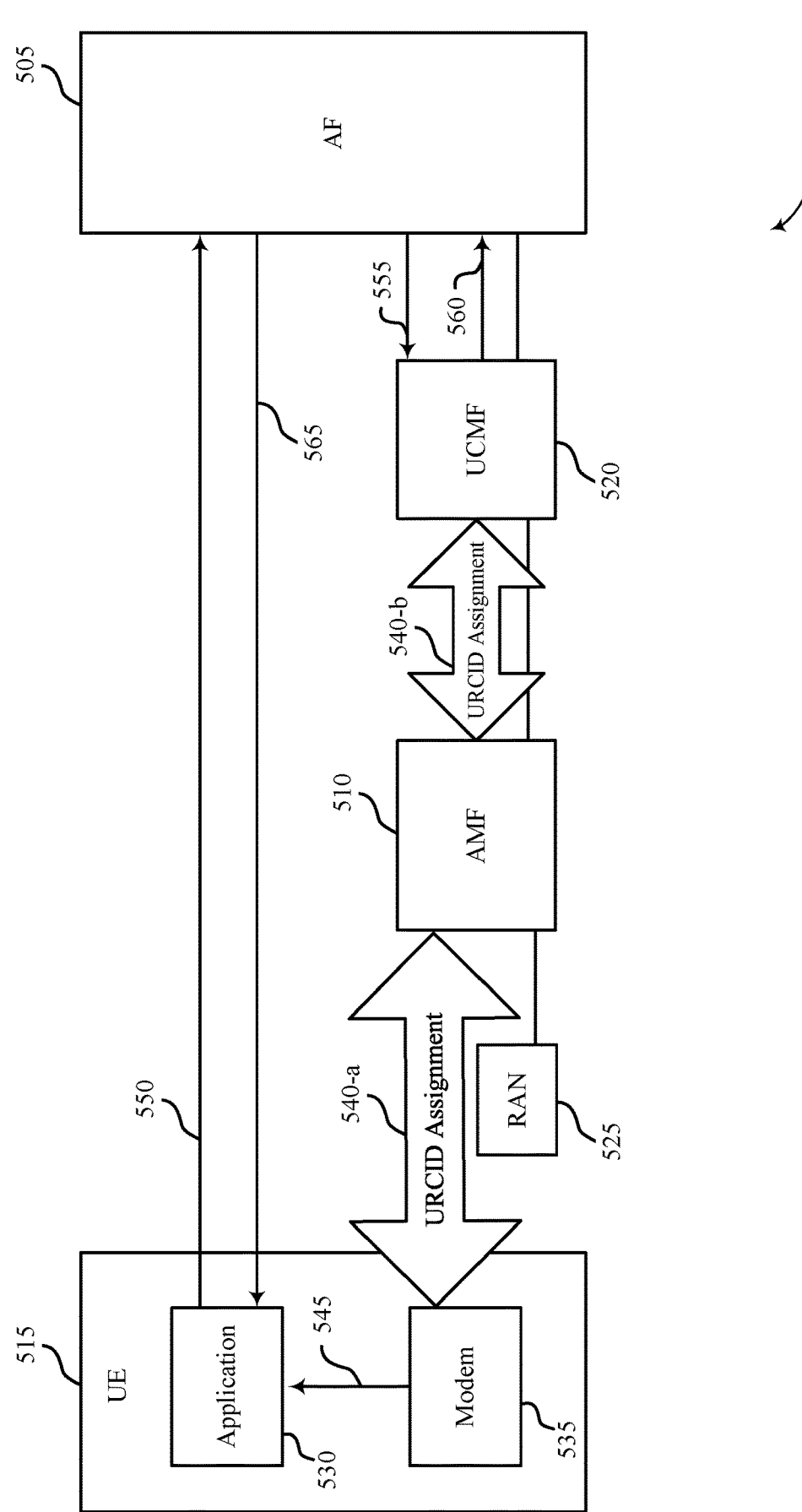
FIGS. 5 and 6 each illustrate an example of a radio capability signaling procedure that supports capability signaling in accordance with aspects of the present disclosure.

FIG. 5 illustrates an example of a radio capability signaling procedure 500 that supports capability signaling in accordance with aspects of the present disclosure. In some examples, the radio capability signaling procedure 500 may include aspects of the wireless communications systems 100, 200, 300-*a*, and 300-*b* described herein with respect to FIGS. 1, 2, 3A, and 3B, respectively. For example, the radio capability signaling procedure 500 may include a UE 515 which may be an example of the corresponding device described herein with reference to FIGS. 1, 2, 3A, 3B, 4A, and 4B. The radio capability signaling procedure 500 may include a RAN node 525 and an AMF 510 which may be examples of the corresponding devices described herein with reference to FIGS. 3A, 3B, 4A, and 4B. In some examples, the actions performed by the AMF 510 may also be performed by an MME, not shown. The radio capability signaling procedure 500 may further include a UCMF 520, which may be an example of the corresponding device described herein with reference to FIGS. 3A, 3B, and 4A. The radio capability signaling procedure 500 may further include an AF 505, which may be an example of the corresponding device described herein with reference to FIG. 3A.

In one example, the radio capability signaling procedure 500 may be performed as part of an initial match procedure. For example, prior to initializing (e.g., establishing a session with) an application, the UE 515 may perform a registration or attach procedure (e.g., depending on whether or not the UE 515 may be attached to the network). In some examples, as part of the registration or attach procedures the network may retrieve radio capabilities from the UE 515. As part of the retrieval of radio capabilities, the UE 515 may be assigned a radio capability identifier (e.g., a first URCID) from the PLMN (e.g., or SNPN). For example, the UE 515 may include a modem 535 which may be used to retrieve the first URCID from the AMF 510 (e.g., during the URCID assignment via an interface 545, which may be an example of an N1 interface). In some examples, the URCID assignment may include the AMF 510 retrieving the first URCID from the UCMF 520 via an interface 540-*b* (e.g., a service-based interface). In some examples, the first URCID may be a PLMN-assigned URCID described herein with reference to FIG. 2.

In some examples, the first URCID signaled to the application 530 may correspond to radio capabilities supported by the UE and the network servicing the UE. Stated alternatively, the first URCID may encompass (e.g., include) the radio capabilities of the RAN node 525. For example, the RAN node 525 may indicate network supported radio capabilities to the UE 515 (e.g., via a Uu interface) or to the AMF 510 (e.g., via an N2 interface). For example, the RAN node 525 may be configured with radio capabilities filtering via RRC signaling and, as such, may indicate one or more radio the capabilities supported by the RAN node 525 via radio capability filtering. In some cases, radio capabilities filtering may be used by the RAN node 525 to indicate features to the UE 515 which may be desirable for the RAN node 525, for example time synchronization adjustment.

In some examples, the RAN node 525 may transmit a request for radio capabilities to the UE 515 via an RRC message. For example, the radio capabilities filter may be signaled to the UE 515 via RRC functionality through an IE, such as the UE-CapabilityRAT-RequestList IE. The UE-CapabilityRAT-RequestList IE may be used to request UE capabilities for one or more radio access technologies from the UE 515. In some examples, the UE-CapabilityRAT-RequestList IE may include a capabilityRequestFilter field and a rat-Type field. The capabilityRequestFilter field may indicate information by which the network may request the UE to filter the UE capabilities (e.g., the capabilities supported by the UE). The rat-Type field may indicate the radio access technology type for which the network may request UE capabilities. For example, if the rat-Type field is set to "NR" or "EUTRA-NR," the encoding of the capabilityRequestFilter may be defined in the UE-CapabilityRequestFilterNR IE. In another example, if the rat-Type field is set to "EUTRA," the encoding of the capabilityRequestFilter field may be defined by a predefined UECapabilityEnquiry message, in which the RAT-Type field in the UE-CapabilityRequest may include "EUTRA."

In response to receiving the radio capabilities filter, the UE 515 may provide radio capabilities corresponding to the radio capabilities filter to the RAN node 525. For example, the UE 515 may indicate one or more capabilities to the RAN node 525 via the UE-CapabilityRequestFilterCommon IE. The UE-CapabilityRequestFilterCommon IE may include a codebookTypeRequest field where a UE may include one or more parameters, such as the SupportedCSI-RS-Resource IE supported for one or more request codebook types (i.e., type I single/multi-panel, type II and type II port selection) into codebookVariantsList, codebookParametersPerBand and codebookParametersPerBC. In some examples, if the codebookTypeRequest field is present and none of the codebook types are requested within the codebookTypeRequest field (i.e., the field may be empty), the UE may include one or more other parameters, such as SupportedCSI-RS-Resource supported for some or all codebook types into codebookVariantsList, codebookParametersPerBand and codebookParametersPerBC.

Additionally, or alternatively, the UE-CapabilityRequestFilterCommon IE may include an includeNE-DC field where a UE (e.g., a UE supporting dual connectivity) may indicate support for dual connectivity in band combinations and may include feature set combinations which may be applicable to a dual connectivity configuration, such as E-UTRA-NR dual connectivity (NE-DC). In some examples, band combinations supporting multiple dual connectivity configurations (e.g., NE-DC and next generation NE-DC ((NG) EN-DC) configurations) may be included in supportedBandCombinationList, and band combinations supporting a single dual connectivity configuration (e.g., the NE-DC configuration) may be included in supportedBandCombinationListNEDC-Only.

Additionally, or alternatively, the UE-CapabilityRequestFilterCommon IE may also include an includeNR-DC field, where a UE (e.g., a UE supporting dual connectivity) may indicate support for one or more dual connectivity configurations, such as NR dual connectivity (NR-DC), in band combinations and may include feature set combinations which may be applicable to the dual connectivity configuration (e.g., NR-DC). Additionally, or alternatively, the UE-CapabilityRequestFilterCommon IE may also include an omitEN-DC field where a UE may omit band combinations and feature set combinations which may be applicable to a dual connectivity configuration, such as (NG) EN-DC. Additionally, or alternatively, the UE-CapabilityRequestFilterCommon IE may also include an uplinkTxSwitchRequest field where a UE (e.g., a UE supporting dynamic uplink transmission switching) may indicate support for uplink transmission switching in band combinations which may be applicable to inter-band uplink carrier aggregation, supplemental uplink, and dual connectivity. The names of IEs described herein may change based at least in part on implementation of one or more devices (e.g., the UE 515, the AF 505, or both), and the examples described herein should not be considered limiting to the scope covered by the claims or the disclosure.

In some examples, the RAN node 525 may forward (e.g., indicate) the radio capabilities to the AMF 510, for example in a radio capabilities container. The AMF 510 (e.g., and the UCMF 520) may store the radio capabilities container which may include the radio capabilities filter that reflects the features supported by the RAN node 525. The UCMF 520 may assign a radio capability identifier (e.g., a URCID) corresponding to the radio capabilities included in the radio capabilities container to the UE 515. In another example, the RAN node 525 may transmit (e.g., to the AMF 510) a radio capabilities container (e.g., may add an IE) indicating the radio capabilities of the RAN node 525 in addition to the IE indicating the radio capabilities of the UE. For example, the RAN node 525 may retrieve the radio capabilities supported by the UE 515 from the UE 515. The RAN node 525 may transmit (e.g., upload via an N2 message) radio capabilities of the UE 515 and the RAN node 525 (e.g., via a RAN capabilities container) to the AMF 510. The AMF 510 may transmit the radio capabilities of the UE (e.g., the UE radio capabilities) and the RAN capabilities container to the UCMF 520. The UCMF 520 may assign a radio capability identifier (e.g., a URCID) to the UE 515 (e.g., based at least in part on the received capabilities for the UE 515) and store the RAN capabilities container associated with the URCID assigned to the UE.

In some examples, a radio capability profile (e.g., associated with a radio capabilities identifier) may include a set of radio features (e.g., capabilities) that may be supported by the UE 515 and the RAN node 525 and that may be checked (e.g., matched) for the corresponding radio features of the application to function properly. In some examples, a radio capabilities profile (e.g., for carrier aggregation or time synchronization adjustment) may be stored in the UCMF and may be identified by a URCID. In some examples, the AF 505 and the UCMF 520 may store (e.g., may have a common dictionary of) the set of radio capabilities which correspond to the radio capabilities profile. In some cases, the radio capabilities may be stored according to a table, such as the following Table 1:

TABLE 1

| ID | Set of radio capabilities |
| --- | --- |
| 1 | 4 × 4 MIMO, 5G time synchronization adjustment, support for bandX |
| 2 | Carrier Aggregation, MR-DC, support for bandZ, support for bandW |
| 3 | Support for bandQ, support for bandP |

At the UE 515, the modem 535 may signal (e.g., via the interface 545) the first URCID to the application 530. The UE 515 (e.g., or the application 530 at the UE 515) may signal the first URCID to at the AF 505. In some examples, the first URCID may be signaled (e.g., via the interface 550) to the AF 505 as part of a session setup message that may include other parameters associated with establishing a session for the application 530. In response, the AF 505 may transmit a request (e.g., a match request) via the interface 555. In some examples, the match request may include the first URCID received from the UE 515 and an application profile identifier associated with the application 530. In some examples, the application profile identifier may correspond to one or more radio features, such as HD video. The UCMF 520 may determine whether the radio capabilities associated with the URCID match the radio capabilities associated with the application profile identifier.

The UCMF 520 may transmit feedback to the AF 505 via the interface 560. In some examples, the feedback may indicate whether the radio capabilities associated with the first URCID match the radio capabilities associated with the application profile identifier. For example, the feedback may include a positive acknowledgement (ACK) if the radio capabilities associated with the first URCID match the radio capabilities associated with the application profile identifier and a negative acknowledgement (NACK), otherwise. In some cases, the match request may include multiple application profile identifiers. In such cases, the UCMF 520 may transmit feedback for each application profile identifier included in the match request. The RAN node 525 may forward (e.g., transmit) the feedback to the UE 515 (e.g., or the application 530 at the UE 515) via the interface 565. The UE 515 may initiate (e.g., establish) a session with the application 530 based at least in part on the feedback. For example, the feedback may include an ACK indicating that the UE 515 may support one or more radio features (e.g., HD video) and, as such, the application may determine a set of operating parameters to achieve the one or more radio features (e.g., HD video) supported by the UE 515.

In some examples, the UE 515 may disable one or more radio capabilities or may move out of a particular radio access technology (e.g., may change connections from NR to LTE) and, as a result, the UE 515 may receive another (e.g., different) radio capability identifier (e.g., a second URCID) from the network. In such an example, the UE 515 (e.g., or the application 530 at the UE 515) may transmit the second URCID to the AF 505. The AF 505 may transmit a match request to the UCMF 520 which includes the second URCID and the application profile identifier corresponding to the one or more radio features (e.g., HD video) of the application 530. In response, the UCMF 520 may transmit feedback to the AF 505 indicating whether the radio capabilities associated with the second URCID match the radio capabilities associated with the application profile identifier. The AF 505 may forward the feedback to the UE 515. In some examples, the feedback may include a NACK indicating that the UE 515 may not support one or more radio features (e.g., HD video). As such, the application 530 may determine a different set of operating parameters to achieve a different one or more radio features (e.g., SD video) supported by the UE 515.

In some other examples, the radio capabilities supported by a network may be different in different locations. As such, if the UE 515 changes locations, the radio capabilities supported by the network may also change. Therefore, in some examples, the UE 515 may receive another (e.g., different) radio capability identifier (e.g., a third URCID) from the network. In such an example, the UE 515 (e.g., or the application 530 at the UE 515) may transmit the third URCID to the AF 505. The AF 505 may transmit a match request to the UCMF 520 which includes the third URCID and the application profile identifier corresponding to the one or more radio features (e.g., HD video). In response, the UCMF 520 may transmit feedback to the AF 505 indicating whether the radio capabilities associated with the third URCID match the radio capabilities associated with the application profile identifier. The AF 505 may forward the feedback to the UE 515. In some examples, the feedback may include a NACK indicating that the UE 515 may not support one or more radio features (e.g., HD video). As such, the application 530 may determine a different set of operating parameters to achieve a different one or more radio features (e.g., SD video) supported by the UE 515.

Figure 6:
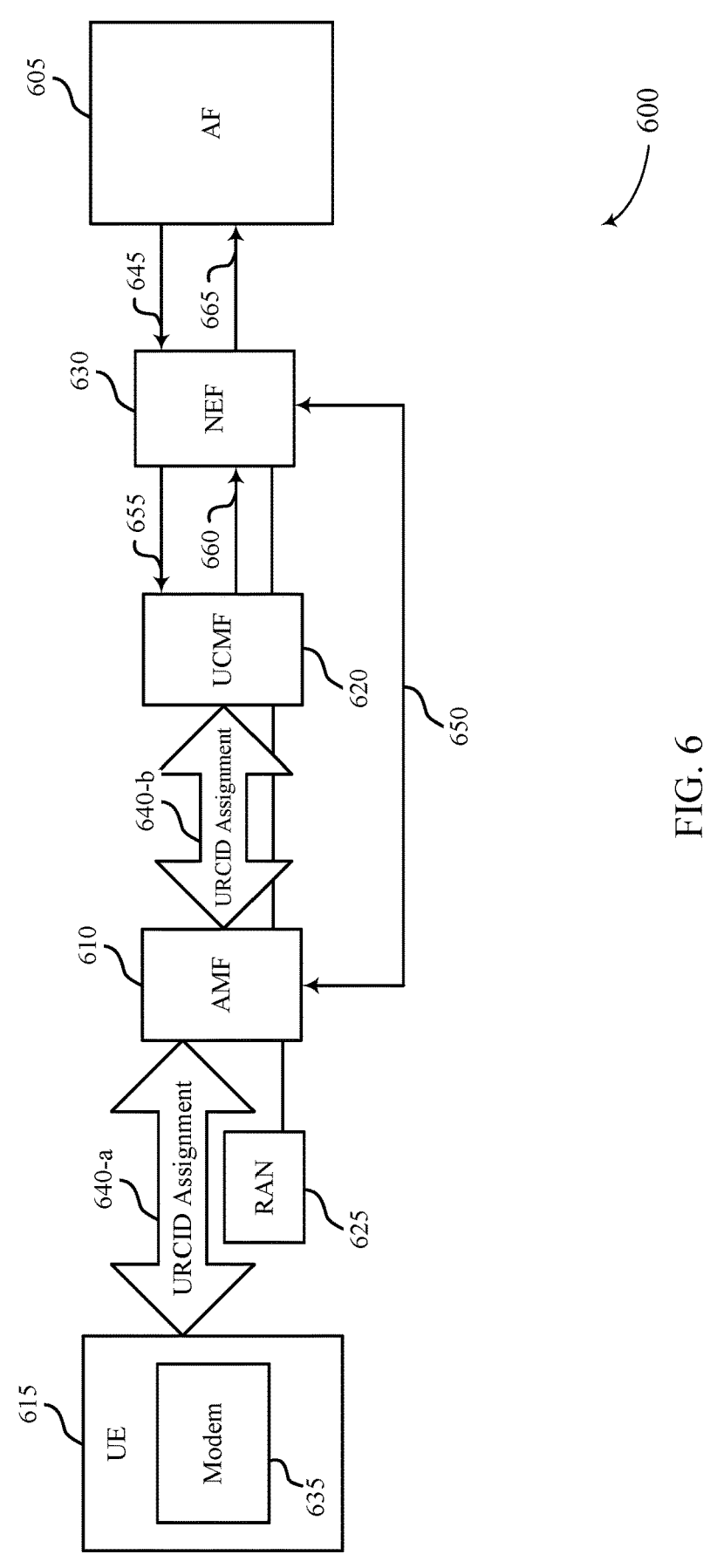

FIG. 6 illustrates an example of a radio capability signaling procedure 600 that supports capability signaling in accordance with aspects of the present disclosure. In some examples, the radio capability signaling procedure 600 may include aspects of the wireless communications systems 100, 200, 300-*a*, and 300-*b* described herein with respect to FIGS. 1, 2, 3A, and 3B, respectively. For example, the radio capability signaling procedure 600 may include a UE 615 which may be an example of the corresponding device described herein with reference to FIGS. 1, 2, 3A, and 3B. The radio capability signaling procedure 600 may also include a RAN node 625 and an AMF 610 which may be examples of the corresponding devices described herein with reference to FIGS. 3A, 3B, 4A, and 4B. In some examples, the actions of the AMF 610 may also be performed by an MME, not shown. The radio capability signaling procedure 600 may further include a UCMF 620, which may be an example of the corresponding device described herein with reference to FIGS. 3A, 3B, and 4A. The radio capability signaling procedure 600 may further include an AF 605 and a NEF 630, which may be an example of the corresponding device described herein with reference to FIG. 3A. In some examples, the actions of the NEF 630 may also be performed by a time sensitive communication time synchronization function (TSCTSF), not shown.

In some examples, the AF 605 may operate externally to the network (e.g., a PLMN). In some examples, to hide the topology of the network from external functions (e.g., the AF 605) a NEF 630 may be used by the AF 605 as an interface to retrieve a radio capabilities identifier (e.g., URCID) for the UE 615. Additionally, or alternatively, the application associated with the UE (not shown) may operate externally to the UE 615. In such an example, prior to establishing a session with the application (e.g., initializing), the UE 615 may be assigned a radio capability identifier (e.g., a first URCID) from the PLMN (e.g., or SMPM) via the NAS. For example, the UE 615 may include a modem 635 which may be used to retrieve the first URCID from the AMF 610 (e.g., during the URCID assignment via an interface 640-*a*). In some examples, the AMF 510 may retrieve the first URCID from the UCMF 620, for example during the URCID assignment via an interface 640-*b* (e.g., a service-based interface). In some examples, the first URCID may be a PLMN-assigned URCID described herein with reference to FIG. 2 or a SNPN-assigned URCID.

Additionally, or alternatively, the AF 605 may obtain the URCID from the AMF 610, for example via the NEF 630. The AF 605 may transmit a match request (e.g., an application programming interface (API) request for time synchronization at the UE 615) to the NEF 630 to obtain the URCID associated with the UE 615 (e.g., via an interface 645). In some examples, the match request may be included in an IE, such as the Nucmf_UECapabilityMatch IE. In some examples, properties corresponding to the match request may be determined by the following table 2:

TABLE 2

| Service Name | Service Operations | Operation Semantics | Example Consumer(s) |
|---|---|---|---|
| Nucmf_UECapabilityMatch | Resolve | Request/ Response | NEF, AF |

The AF 605 may use (e.g., via NEF 630) the service (e.g., the Nucmf_UECapabilityMatch IE) to match the received URCID against one or more radio capability profiles identified by the profile identifiers. The profile identifiers may be configured in the UCMF 620. The UCMF 620 may match the radio capabilities of the received URCID against the identified profile and provide feedback (e.g., a success or failure indication) depending on whether the radio capabilities matched or not. In some examples, the input may include a list, such as the following list: [UE Radio Capability ID, Profile ID(s)]. Additionally, or alternatively, the output may include a list, such as the following list: [UE Radio Capability ID, Profile ID match result (success or failure)].

As an illustrative example, the NEF 630 may retrieve the URCID from the AMF 610 via the interface 650. The NEF 630 may transmit (e.g., via an interface 655) the match request to the UCMF 620 which includes the URCID obtained from the AMF 610 and the application profile identifier corresponding to the one or more radio features (e.g., HD video) of the application. In response, the UCMF 620 may transmit feedback to the NEF 630 via an interface 660. The NEF 630 may determine, based at least in part on the feedback received from the UCMF 620, whether the request transmitted from the AMF 610 may be fulfilled. In some cases, the NEF may transmit (e.g., via an interface 665) feedback indicating whether the request may be filled and, as such, whether the radio capabilities associated with the URCID match the radio capabilities associated with the application profile identifier.

FIG. 7 illustrates an example of a method 700 that supports capability signaling in accordance with aspects of the present disclosure. In some examples, the method 700 may include aspects of the wireless communications systems 100 and 200 described herein with respect to FIGS. 1 and 2, respectively. For example, the method 700 may be implemented by a UE or a network entity, which may be examples of a UE 215 and a network entity 205 described herein with reference to FIG. 2. Aspects of the method 700 may be implemented by a UCMF, a NEF, and an AF, which may be examples of the corresponding devices described herein with respect to FIGS. 5 and 6.

In some examples, a UE and a network entity servicing the UE may employ one or more techniques for matching the radio capabilities of the UE and the network entity with the radio capabilities associated with a desired performance level of an application. For example, prior to the initialization of the application by the UE, the UE may transmit a radio capability identifier, such as a URCID, to a network entity, such as an AF. In another example, the UE may transmit (e.g., pass) the URCID to the application at the UE and the application may pass the URCID to the AF (e.g., the application server). The URCID may correspond to a set of radio capabilities supported by the UE as well as the network that is servicing the UE. For example, a RAN node may indicate support for one or more radio features (e.g., capabilities) to a network function (e.g., the UCMF via the AMF).

In some examples, the RAN node may indicate the one or more radio capabilities via radio capability filtering, and in some other examples, the RAN node may indicate the radio capabilities via parameters indicating support of the one or more radio capabilities. The AF may transmit a match request to a UCMF, which may determine whether the set of radio capabilities associated with each application profile identifier match the radio capabilities associated with the URCID of the UE. For example, the UCMF may store the radio capabilities which are supported by the RAN node and associated with the radio capabilities of the UE for the indicated URCID. The UCMF may also stores radio capabilities profiles associated with URCIDs and match the support of particular radio features identified by the radio capabilities profile against the RAN support of specific features and radio capabilities of the UE. The UCMF may also indicate, to an external entity, whether the match is successful or not (e.g., via ACK or NACK feedback). The external entity may be an AF if the AF is operating within the network (e.g., if the AF is trusted) or a NEF if the AF is operating outside of the network (e.g., if AF is not trusted). In some examples, the AF may initiate the match of the indicated radio features with the UCMF (e.g., or optionally via the NEF).

As an illustrative example, at 705, a UCMF may receive a radio capability identifier (e.g., a URCID) and an application profile identifier from an NEF/AF (e.g., an AF or a NEF if the AF is operating outside of the network). At 710, the UCMF may retrieve one or more radio capabilities identified by the radio capability identifier (e.g., may use the URCID to determine the radio capabilities supported by the UE). At 715, the UCMF may determine whether the one or more radio capabilities identified by the URCID match one or more radio capabilities identified by the application profile identifier. At 720, the UCMF may transmit feedback (e.g., ACK or NACK) indicating whether the one or more radio capabilities identified by the URCID match the one or more radio capabilities identified by the application profile identifier. For example, the feedback may include "ACK" if the radio capabilities associated with the URCID match the radio capabilities associated with the application profile identifier and "NACK" if the radio capabilities associated with the URCID do not match the radio capabilities associated with the application profile identifier. In some examples, determining whether the radio capabilities associated with a desired performance level of an application may increase resource utilization at the UE and network inefficiencies may be reduced.

Figure 8:
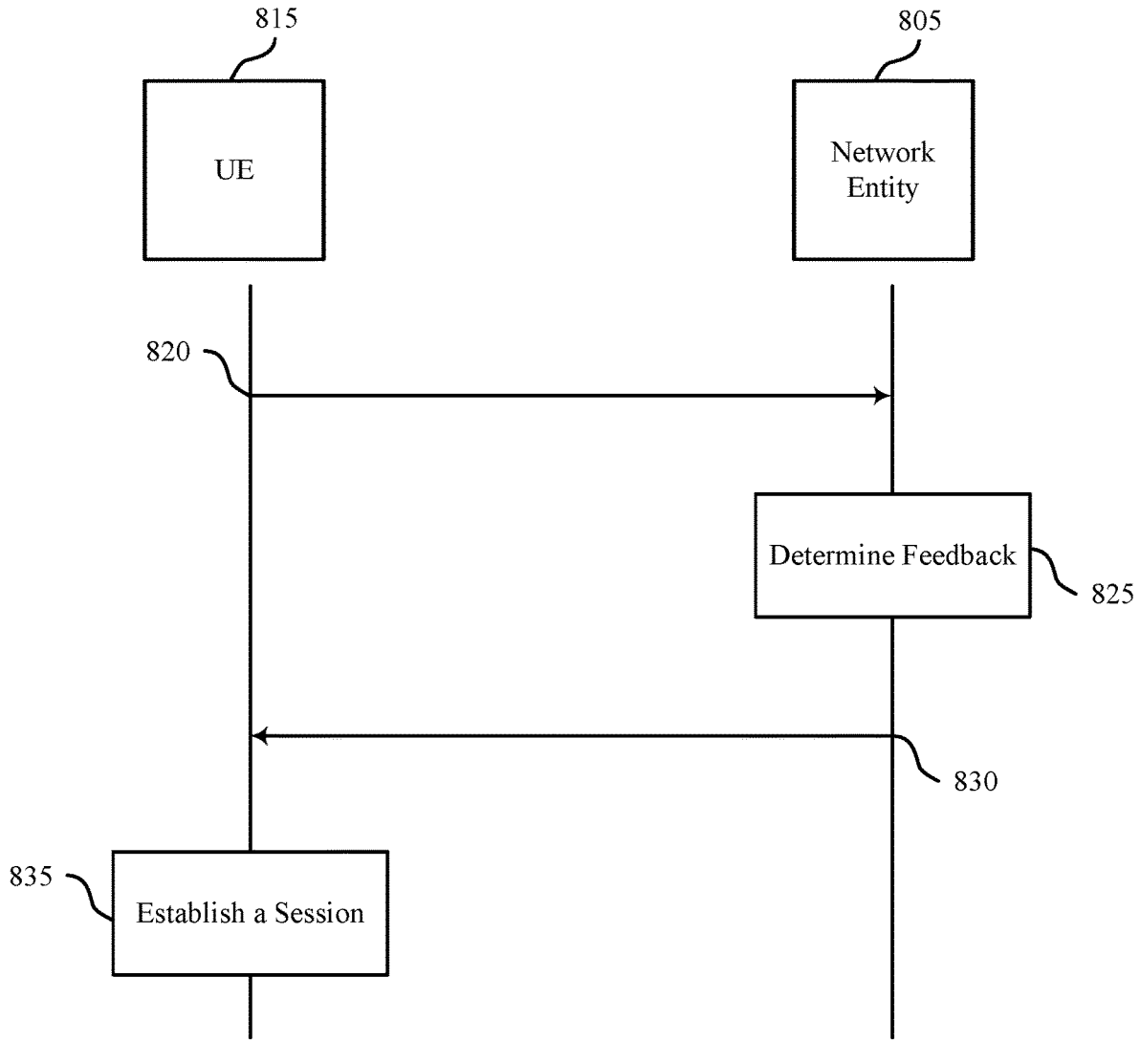
FIG. 8 illustrates an example of a process flow that supports capability signaling in accordance with aspects of the present disclosure.

FIG. 8 illustrates an example of a process flow 800 that supports capability signaling in accordance with aspects of the present disclosure. In some examples, the process flow 800 may implement or be implemented by one or more aspects of the wireless communications systems 100, 200, 300-a, and 300-b described herein with respect to FIGS. 1, 2, 3A, and 3B, respectively. For example, the process flow 800 may be implemented by a network entity 805 or a UE 815, which may be examples of the corresponding devices described herein with reference to FIG. 2. In some examples, the network entity 805 and the UE 815 may implement the process flow 800 to promote network efficiencies by supporting network and UE radio capability signaling, as described herein. The process flow 800 may also be implemented by the network entity 805 and the UE 815 to promote high reliability and low latency operations, among other benefits. In the following description of the process flow 800, the operations between the UE 815 and the network entity 805 may be transmitted in a different order than the example order shown, or the operations performed by the UE 815 and the network entity 805 may be performed in different orders or at different times. Some operations may also be omitted.

In some examples, a UE may transmit a radio capability identifier to a network entity. For example, at 820, the UE 815 may transmit a radio capability identifier (e.g., a URCID) to the network entity 805. The URCID may be an example of a URCID described herein with respect to FIGS. 5 and 6, and may indicate at least one radio capability of the UE 815 for an application associated with the UE 815. At 825, the network entity 805 may determine feedback in response to receiving the URCID. The feedback may indicate whether the one or more radio capabilities indicated by the URCID satisfy a respective radio capability of a radio capability profile for the application associated with the UE 815. At 830, the network entity 805 may transmit the determined feedback to the UE 815. At 835, the UE 815 may establish a session for the application associated with the UE 815 in response to receiving the feedback. As described herein, signaling the radio capabilities of the network and the UE 815 may promote network efficiencies.

Figure 9:
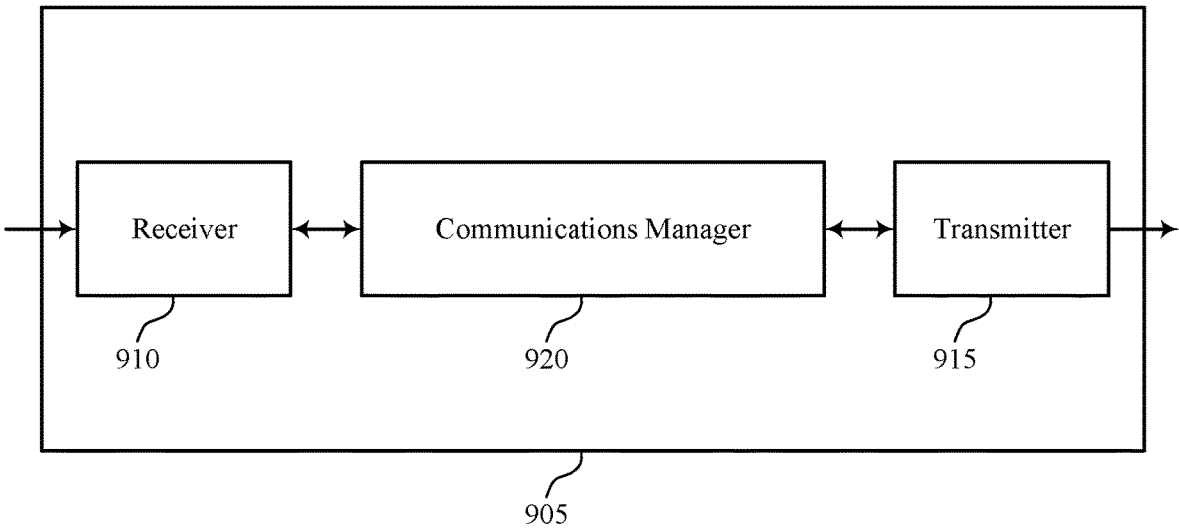
FIGS. 9 and 10 show block diagrams of devices that support capability signaling in accordance with aspects of the present disclosure.

FIG. 9 shows a block diagram 900 of a device 905 that supports capability signaling in accordance with aspects of the present disclosure. The device 905 may be an example of aspects of a UE 115 as described herein. The device 905 may include a receiver 910, a transmitter 915, and a communications manager 920. The device 905 may also include a processor (not shown). Each of these components may be in communication with one another (e.g., via one or more buses).

The receiver 910 may provide a means for receiving information such as packets, user data, control information, or any combination thereof associated with various information channels (e.g., control channels, data channels, information channels related to network and UE capability signaling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network and UE capability signaling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of network and UE capability signaling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described herein. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described herein).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a UE in accordance with examples as disclosed herein. For example, the communications manager 920 may be configured as or otherwise support a means for transmitting, to a first network entity, a radio capability identifier indicating at least one radio capability of a set of radio capabilities of the UE. The communications manager 920 may be configured as or otherwise support a means for receiving, from the first network entity, feedback indicating whether the at least one radio capability indicated by the radio capability identifier satisfies a respective radio capability of a radio capability profile for an application associated with the UE. The communications manager 920 may be configured as or otherwise support a means for establishing a session for the application associated with the UE based at least in part on the feedback indicating whether the at least one radio capability indicated by the radio capability identifier satisfies the respective radio capability of the radio capability profile for the application.

By including or configuring the communications manager 920 in accordance with examples as described herein, the device 905 (e.g., a processor controlling or otherwise coupled with the receiver 910, the transmitter 915, the communications manager 920, or any combination thereof) may support techniques for network and UE capability signaling in accordance with aspects of the present disclosure. For example, the device 905 may indicate radio capabilities to a network entity, which may result in more efficient utilization of communication resources.

Figure 10:
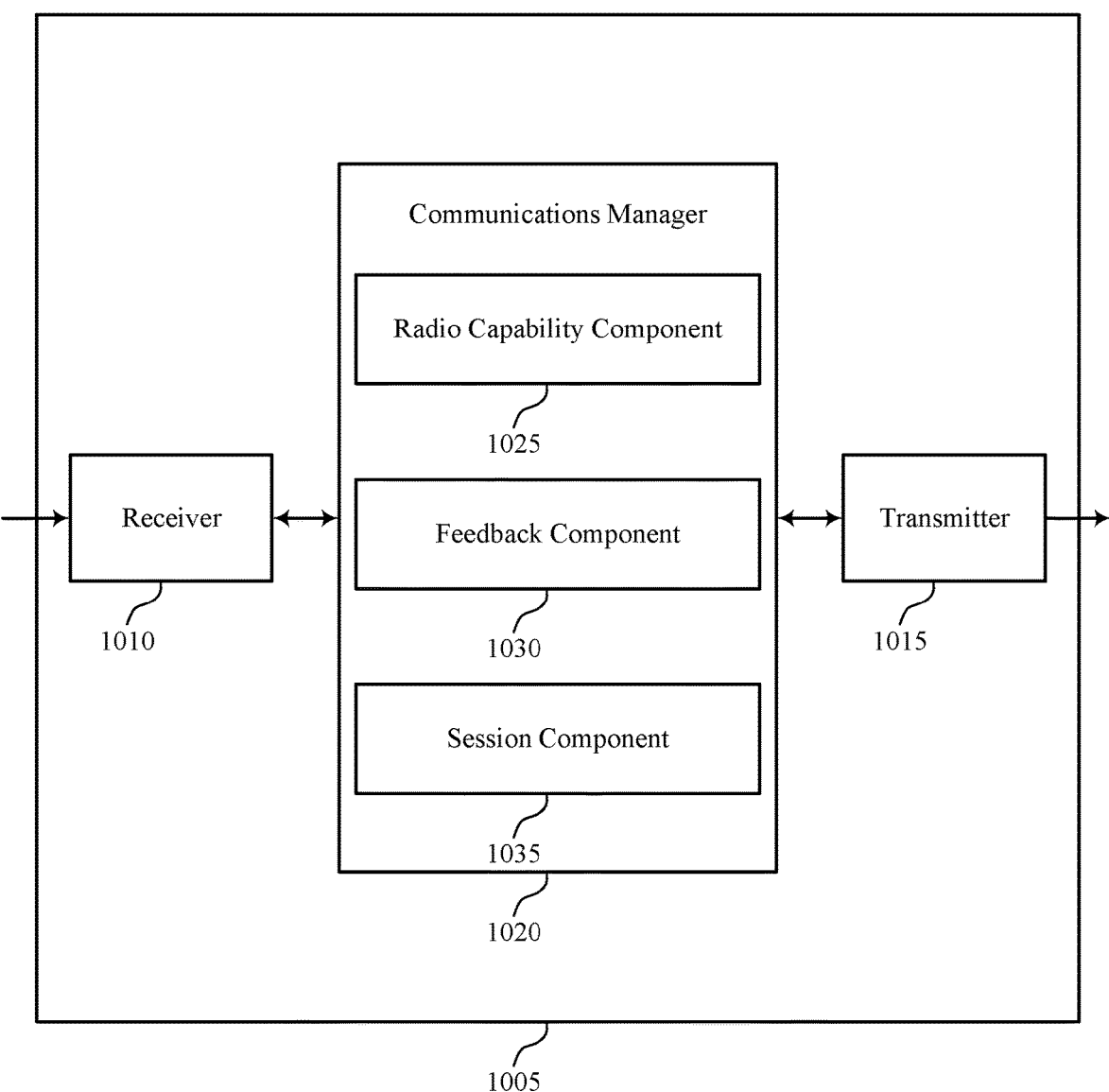

FIG. 10 shows a block diagram 1000 of a device 1005 that supports capability signaling in accordance with aspects of the present disclosure. The device 1005 may be an example of aspects of a device 905 or a UE 115 as described herein. The device 1005 may include a receiver 1010, a transmitter 1015, and a communications manager 1020. The device 1005 may also include a processor (not shown). Each of these components may be in communication with one another (e.g., via one or more buses).

The receiver 1010 may provide a means for receiving information such as packets, user data, control information, or any combination thereof associated with various information channels (e.g., control channels, data channels, information channels related to network and UE capability signaling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network and UE capability signaling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of network and UE capability signaling as described herein. For example, the communications manager 1020 may include a radio capability component 1025, a feedback component 1030, a session component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. The radio capability component 1025 may be configured as or otherwise support a means for transmitting, to a first network entity, a radio capability identifier indicating at least one radio capability of a set of radio capabilities of the UE. The feedback component 1030 may be configured as or otherwise support a means for receiving, from the first network entity, feedback indicating whether the at least one radio capability indicated by the radio capability identifier satisfies a respective radio capability of a radio capability profile for an application associated with the UE. The session component 1035 may be configured as or otherwise support a means for establishing a session for the application associated with the UE based at least in part on the feedback indicating whether the at least one radio capability indicated by the radio capability identifier satisfies the respective radio capability of the radio capability profile for the application.

FIG. 11 shows a block diagram 1100 of a communications manager 1120 that supports capability signaling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of network and UE capability signaling as described herein. For example, the communications manager 1120 may include a radio capability component 1125, a feedback component 1130, a session component 1135, a radio capability filter component 1140, or any combination thereof. Each of these components may communicate, directly or indirectly, with one another (e.g., via one or more buses).

The communications manager 1120 may support wireless communication at a UE in accordance with examples as disclosed herein. The radio capability component 1125 may be configured as or otherwise support a means for transmitting, to a first network entity, a radio capability identifier indicating at least one radio capability of a set of radio capabilities of the UE. The feedback component 1130 may be configured as or otherwise support a means for receiving, from the first network entity, feedback indicating whether the at least one radio capability indicated by the radio capability identifier satisfies a respective radio capability of a radio capability profile for an application associated with the UE. The session component 1135 may be configured as or otherwise support a means for establishing a session for the application associated with the UE based at least in part on the feedback indicating whether the at least one radio capability indicated by the radio capability identifier satisfies the respective radio capability of the radio capability profile for the application.

In some examples, the radio capability component 1125 may be configured as or otherwise support a means for receiving, from a second network entity, the radio capability identifier, where transmitting the radio capability identifier may be based at least in part on receiving, from the second network entity, the radio capability identifier. In some examples, the radio capability component 1125 may be configured as or otherwise support a means for receiving, from the second network entity, a second radio capability identifier based at least in part on a change to one or more radio capabilities of the UE, the second radio capability identifier indicating that the one or more radio capabilities are different. In some examples, the radio capability component 1125 may be configured as or otherwise support a means for transmitting, to the first network entity, the second radio capability identifier. In some examples, the feedback component 1130 may be configured as or otherwise support a means for receiving, from the first network entity, second feedback indicating whether the one or more radio capabilities indicated by the second radio capability identifier satisfies the respective radio capability of the radio capability profile for the application associated with the UE.

In some examples, the second network entity includes an access and mobility management function or a mobility management entity. In some examples, the radio capability identifier indicates the at least one radio capability of the UE and a respective radio capability supported by a network serving the UE. In some examples, the radio capability filter component 1140 may be configured as or otherwise support a means for receiving, from the second network entity, a radio capability filter associated with one or more radio capabilities supported by the network serving the UE. In some examples, the radio capability component 1125 may be configured as or otherwise support a means for transmitting, to the second network entity, a second set of radio capabilities corresponding to the radio capability filter, where receiving, from the second network entity, the radio capability identifier may be based at least in part on transmitting, to the second network entity, the second set of radio capabilities corresponding to the radio capability filter.

In some examples, to support receiving the feedback, the feedback component 1130 may be configured as or otherwise support a means for receiving, from the first network entity, second feedback indicating that the at least one radio capability indicated by the radio capability identifier satisfies the respective radio capability of the radio capability profile for the application associated with the UE, the second feedback including a positive acknowledgement. In some examples, to support receiving the feedback, the feedback component 1130 may be configured as or otherwise support a means for receiving, from the first network entity, second feedback indicating that the at least one radio capability indicated by the radio capability identifier fails to satisfy the respective radio capability of the radio capability profile for the application associated with the UE, the second feedback including a negative acknowledgement. In some examples, the radio capability identifier is stored in a memory at the UE. In some examples, the first network entity includes an AF.

Figure 12:
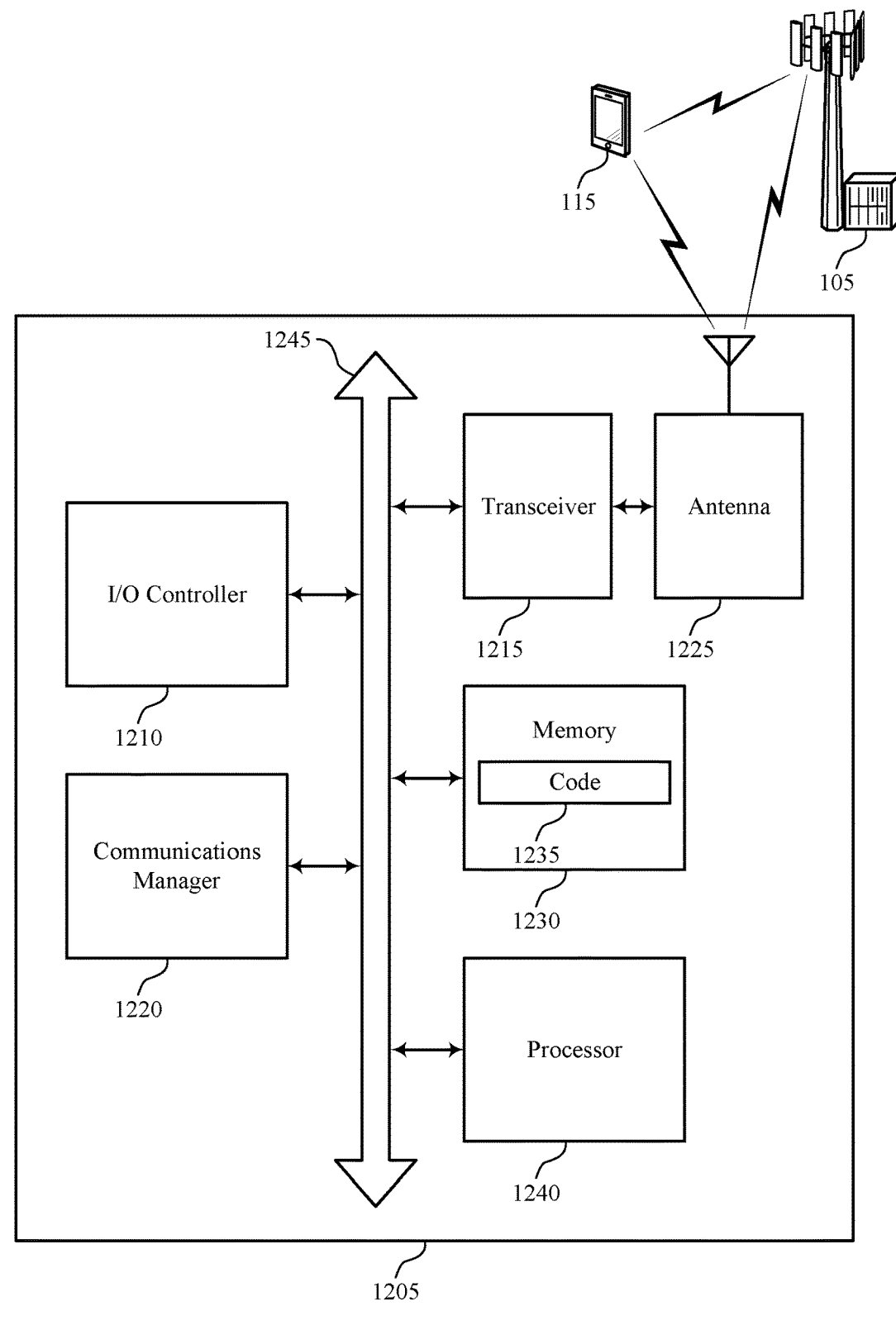
FIG. 12 shows a diagram of a system including a device that supports capability signaling in accordance with aspects of the present disclosure.

FIG. 12 shows a diagram of a system 1200 including a device 1205 that supports capability signaling in accordance with aspects of the present disclosure. The device 1205 may be an example of or include the components of a device 905, a device 1005, or a UE 115 as described herein. The device 1205 may communicate wirelessly with one or more network entities 205, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally, or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting network and UE capability signaling). For example, the device 1205 or a component of the device 1205 may include a processor 1240 and memory 1230 coupled with the processor 1240, the processor 1240 and memory 1230 configured to perform various functions described herein.

The communications manager 1220 may support wireless communication at the device 1205 (e.g., a UE) in accordance with examples as disclosed herein. For example, the communications manager 1220 may be configured as or otherwise support a means for transmitting, to a first network entity, a radio capability identifier indicating at least one radio capability of a set of radio capabilities of the UE. The communications manager 1220 may be configured as or otherwise support a means for receiving, from the first network entity, feedback indicating whether the at least one radio capability indicated by the radio capability identifier satisfies a respective radio capability of a radio capability profile for an application associated with the UE. The communications manager 1220 may be configured as or otherwise support a means for establishing a session for the application associated with the UE based at least in part on the feedback indicating whether the at least one radio capability indicated by the radio capability identifier satisfies the respective radio capability of the radio capability profile for the application. By including or configuring the communications manager 1220 in accordance with examples as described herein, the device 1205 may support techniques for capability signaling in accordance with aspects of the present disclosure. For example, the device 1205 may indicate radio capabilities to a network entity, which may result in reduced latency, more efficient utilization of communication resources, and improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described herein with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network and UE capability signaling as described herein, or the processor 1240 and the memory 1230 may be otherwise configured to perform or support such operations.

Figure 13:
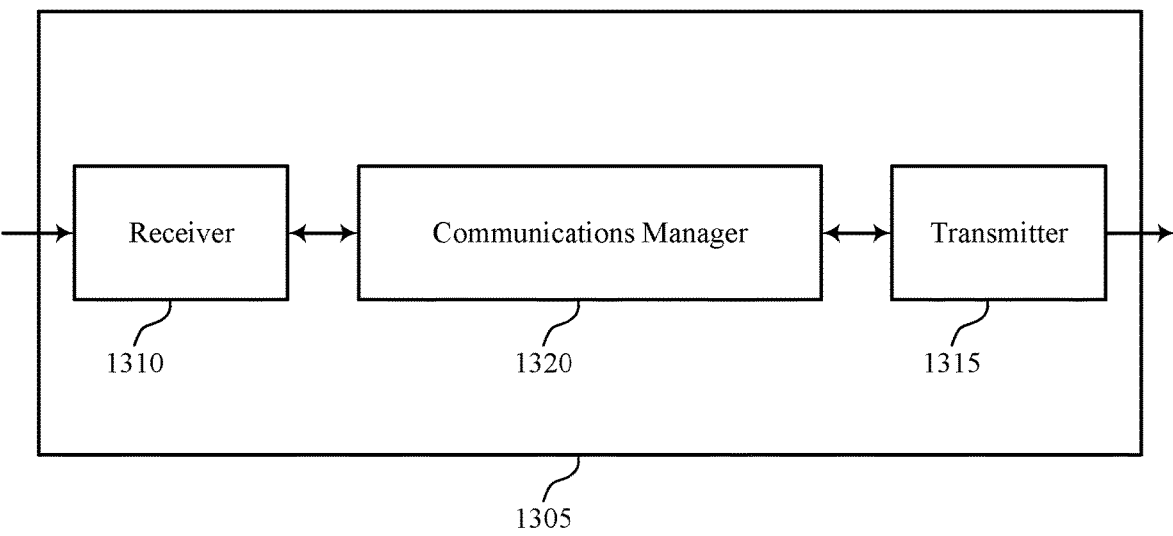
FIGS. 13 and 14 show block diagrams of devices that support capability signaling in accordance with aspects of the present disclosure.

FIG. 13 shows a block diagram 1300 of a device 1305 that supports capability signaling in accordance with aspects of the present disclosure. The device 1305 may be an example of aspects of a network entity 205 as described herein. The device 1305 may include a receiver 1310, a transmitter 1315, and a communications manager 1320. The device 1305 may also include a processor (not shown). Each of these components may be in communication with one another (e.g., via one or more buses).

The receiver 1310 may provide a means for receiving information such as packets, user data, control information, or any combination thereof associated with various information channels (e.g., control channels, data channels, information channels related to network and UE capability signaling). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to network and UE capability signaling). In some examples, the transmitter 1315 may be co-located with a receiver 1310 in a transceiver module. The transmitter 1315 may utilize a single antenna or a set of multiple antennas.

The communications manager 1320, the receiver 1310, the transmitter 1315, or various combinations thereof or various components thereof may be examples of means for performing various aspects of network and UE capability signaling as described herein. For example, the communications manager 1320, the receiver 1310, the transmitter 1315, or various combinations or components thereof may support a method for performing one or more of the functions described herein.

In some examples, the communications manager 1320, the receiver 1310, the transmitter 1315, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described herein. In some examples, a processor and memory coupled with the processor may be configured to perform one or more of the functions described herein (e.g., by executing, by the processor, instructions stored in the memory).

Additionally, or alternatively, in some examples, the communications manager 1320, the receiver 1310, the transmitter 1315, or various combinations or components thereof may be implemented in code (e.g., as communications management software or firmware) executed by a processor. If implemented in code executed by a processor, the functions of the communications manager 1320, the receiver 1310, the transmitter 1315, or various combinations or components thereof may be performed by a general-purpose processor, a DSP, a CPU, an ASIC, an FPGA, or any combination of these or other programmable logic devices (e.g., configured as or otherwise supporting a means for performing the functions described herein).

In some examples, the communications manager 1320 may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a first network entity in accordance with examples as disclosed herein. For example, the communications manager 1320 may be configured as or otherwise support a means for receiving a radio capability identifier indicating at least one radio capability of a set of radio capabilities of a UE. The communications manager 1320 may be configured as or otherwise support a means for determining, based at least in part on the radio capability identifier, feedback indicating whether the at least one radio capability indicated by the radio capability identifier satisfies a respective radio capability of a radio capability profile. The communications manager 1320 may be configured as or otherwise support a means for transmitting, to the UE, the feedback.

By including or configuring the communications manager 1320 in accordance with examples as described herein, the device 1305 (e.g., a processor controlling or otherwise coupled with the receiver 1310, the transmitter 1315, the communications manager 1320, or any combination thereof) may support techniques for capability signaling in accordance with aspects of the present disclosure. For example, the device 1305 may indicate whether radio capabilities of a UE satisfy respective radio capabilities of a radio capability profile for an application associated with a UE, which may result in more efficient utilization of communication resources.

Figure 14:
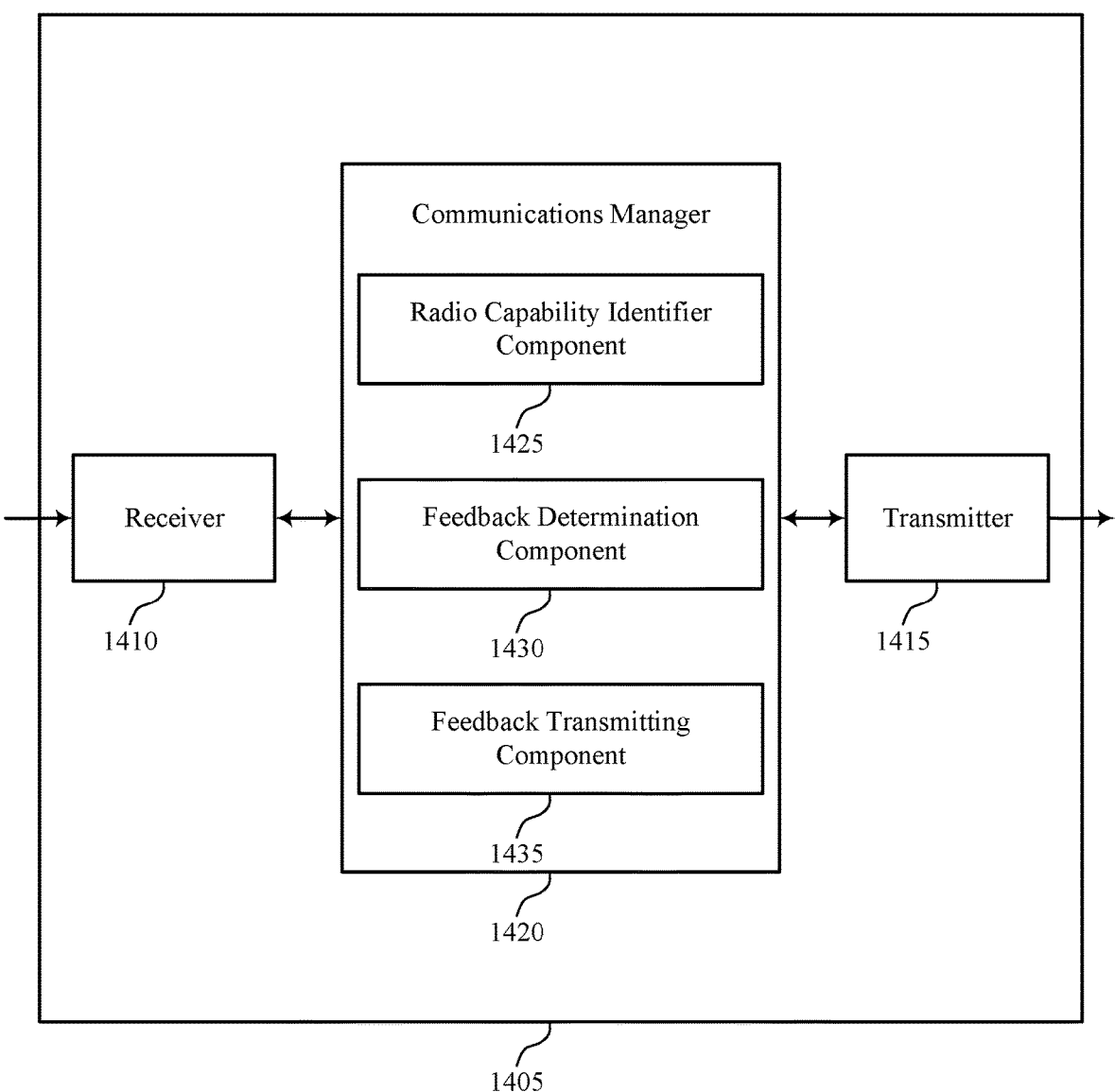

FIG. 14 shows a block diagram 1400 of a device 1405 that supports capability signaling in accordance with aspects of the present disclosure. The device 1405 may be an example of aspects of a device 1305 or a network entity 205 as described herein. The device 1405 may include a receiver 1410, a transmitter 1415, and a communications manager 1420. The device 1405 may also include a processor (not shown). Each of these components may be in communication with one another (e.g., via one or more buses).

The receiver 1410 may provide a means for receiving information such as packets, user data, control information, or any combination thereof associated with various information channels (e.g., control channels, data channels, information channels related to network and UE capability signaling). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (e.g., control channels, data channels, information channels related to network and UE capability signaling). In some examples, the transmitter 1415 may be co-located with a receiver 1410 in a transceiver module. The transmitter 1415 may utilize a single antenna or a set of multiple antennas.

The device 1405, or various components thereof, may be an example of means for performing various aspects of network and UE capability signaling as described herein. For example, the communications manager 1420 may include a radio capability identifier component 1425, a feedback determination component 1430, a feedback transmitting component 1435, or any combination thereof. The communications manager 1420 may be an example of aspects of a communications manager 1320 as described herein. In some examples, the communications manager 1420, or various components thereof, may be configured to perform various operations (e.g., receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communication at a first network entity in accordance with examples as disclosed herein. The radio capability identifier component 1425 may be configured as or otherwise support a means for receiving a radio capability identifier indicating at least one radio capability of a set of radio capabilities of a UE. The feedback determination component 1430 may be configured as or otherwise support a means for determining, based at least in part on the radio capability identifier, feedback indicating whether the at least one radio capability indicated by the radio capability identifier satisfies a respective radio capability of a radio capability profile. The feedback transmitting component 1435 may be configured as or otherwise support a means for transmitting, to the UE, the feedback.

Figure 15:
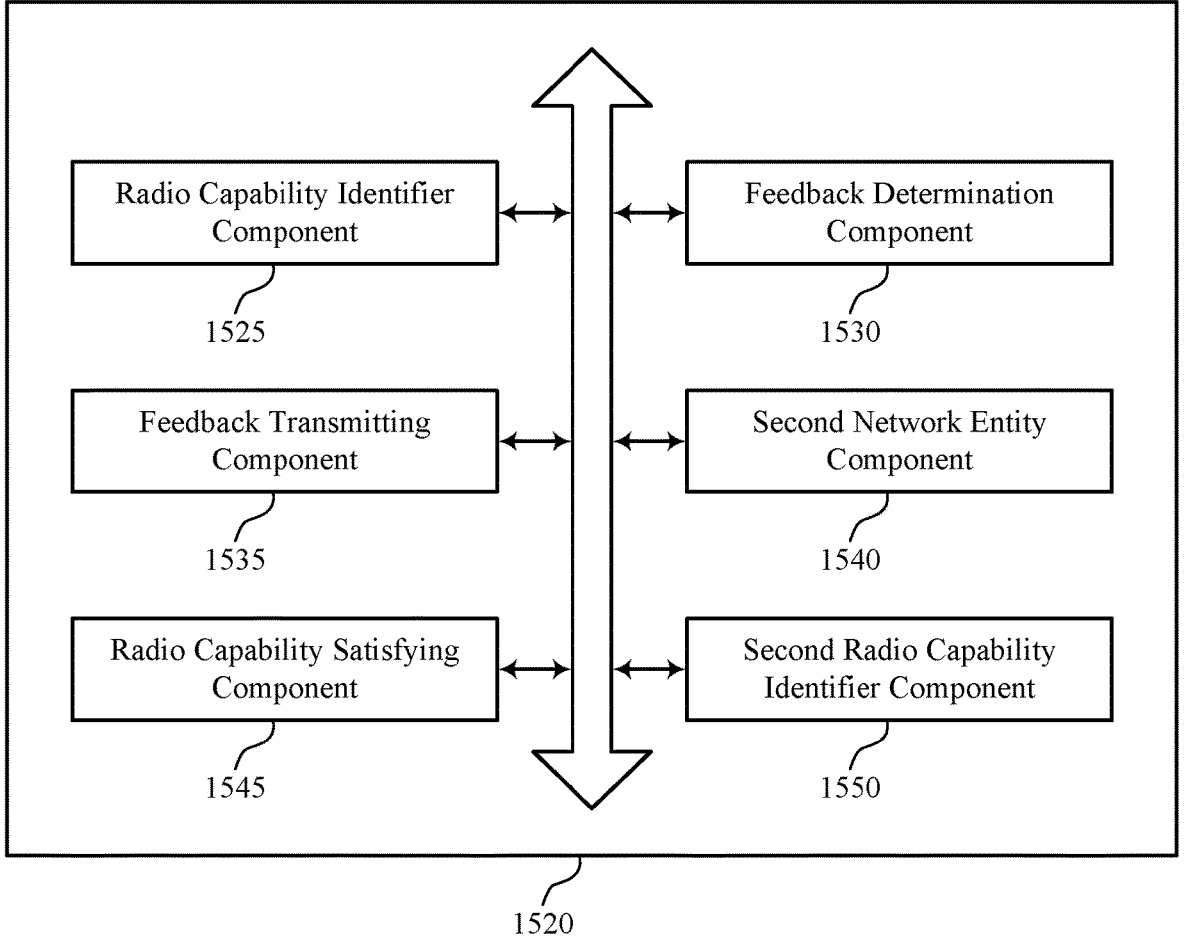
FIG. 15 shows a block diagram of a communications manager that supports capability signaling in accordance with aspects of the present disclosure.

FIG. 15 shows a block diagram 1500 of a communications manager 1520 that supports capability signaling in accordance with aspects of the present disclosure. The communications manager 1520 may be an example of aspects of a communications manager 1320, a communications manager 1420, or both, as described herein. The communications manager 1520, or various components thereof, may be an example of means for performing various aspects of network and UE capability signaling as described herein. For example, the communications manager 1520 may include a radio capability identifier component 1525, a feedback determination component 1530, a feedback transmitting component 1535, a second network entity component 1540, a radio capability satisfying component 1545, a second radio capability identifier component 1550, or any combination thereof. Each of these components may communicate, directly or indirectly, with one another (e.g., via one or more buses).

The communications manager 1520 may support wireless communication at a first network entity in accordance with examples as disclosed herein. The radio capability identifier component 1525 may be configured as or otherwise support a means for receiving a radio capability identifier indicating at least one radio capability of a set of radio capabilities of a UE. The feedback determination component 1530 may be configured as or otherwise support a means for determining, based at least in part on the radio capability identifier, feedback indicating whether the at least one radio capability indicated by the radio capability identifier satisfies a respective radio capability of a radio capability profile. The feedback transmitting component 1535 may be configured as or otherwise support a means for transmitting, to the UE, the feedback.

In some examples, to support determining the feedback, the second network entity component 1540 may be configured as or otherwise support a means for transmitting, to a second network entity, an indication of the radio capability identifier of the UE and an indication of the radio capability profile for an application associated with the UE. In some examples, to support determining the feedback, the radio capability satisfying component 1545 may be configured as or otherwise support a means for receiving, from the second network entity, an indication of whether the at least one radio capability satisfies the respective radio capability of the radio capability profile for the application associated with the UE, the second network entity including a UE capability management function. In some examples, to support receiving the radio capability identifier indicating the at least one radio capability of the set of radio capabilities of the UE, the radio capability identifier component 1525 may be configured as or otherwise support a means for receiving, from the UE, the radio capability identifier, where determining the feedback may be based at least in part on receiving, from the UE, the radio capability identifier.

In some examples, the second radio capability identifier component 1550 may be configured as or otherwise support a means for receiving, from the UE, a second radio capability identifier indicating one or more radio capabilities that are different. In some examples, the radio capability satisfying component 1545 may be configured as or otherwise support a means for determining, based at least in part on the second radio capability identifier, second feedback indicating whether the one or more radio capabilities indicated by the second radio capability identifier satisfy the respective radio capability of the radio capability profile for an application associated with the UE. In some examples, the feedback transmitting component 1535 may be configured as or otherwise support a means for transmitting, to the UE, the second feedback.

In some examples, to support receiving the radio capability identifier indicating the at least one radio capability, the radio capability identifier component 1525 may be configured as or otherwise support a means for transmitting, to a second network entity, a request for the radio capability identifier. In some examples, to support receiving the radio capability identifier indicating the at least one radio capability, the radio capability identifier component 1525 may be configured as or otherwise support a means for receiving, from the second network entity, the radio capability identifier, the second network entity including an access and mobility management function or a mobility management entity.

In some examples, the feedback transmitting component 1535 may be configured as or otherwise support a means for transmitting, to the UE, second feedback indicating that the at least one radio capability indicated by the radio capability identifier satisfies the respective radio capability of the radio capability profile for an application associated with the UE, the second feedback including a positive acknowledgement. In some examples, the feedback transmitting component 1535 may be configured as or otherwise support a means for transmitting, to the UE, second feedback indicating that the at least one radio capability indicated by the radio capability identifier does not satisfy the respective radio capability of the radio capability profile for an application associated with the UE, the second feedback including a negative acknowledgement. In some examples, the first network entity includes an AF.

Figure 16:
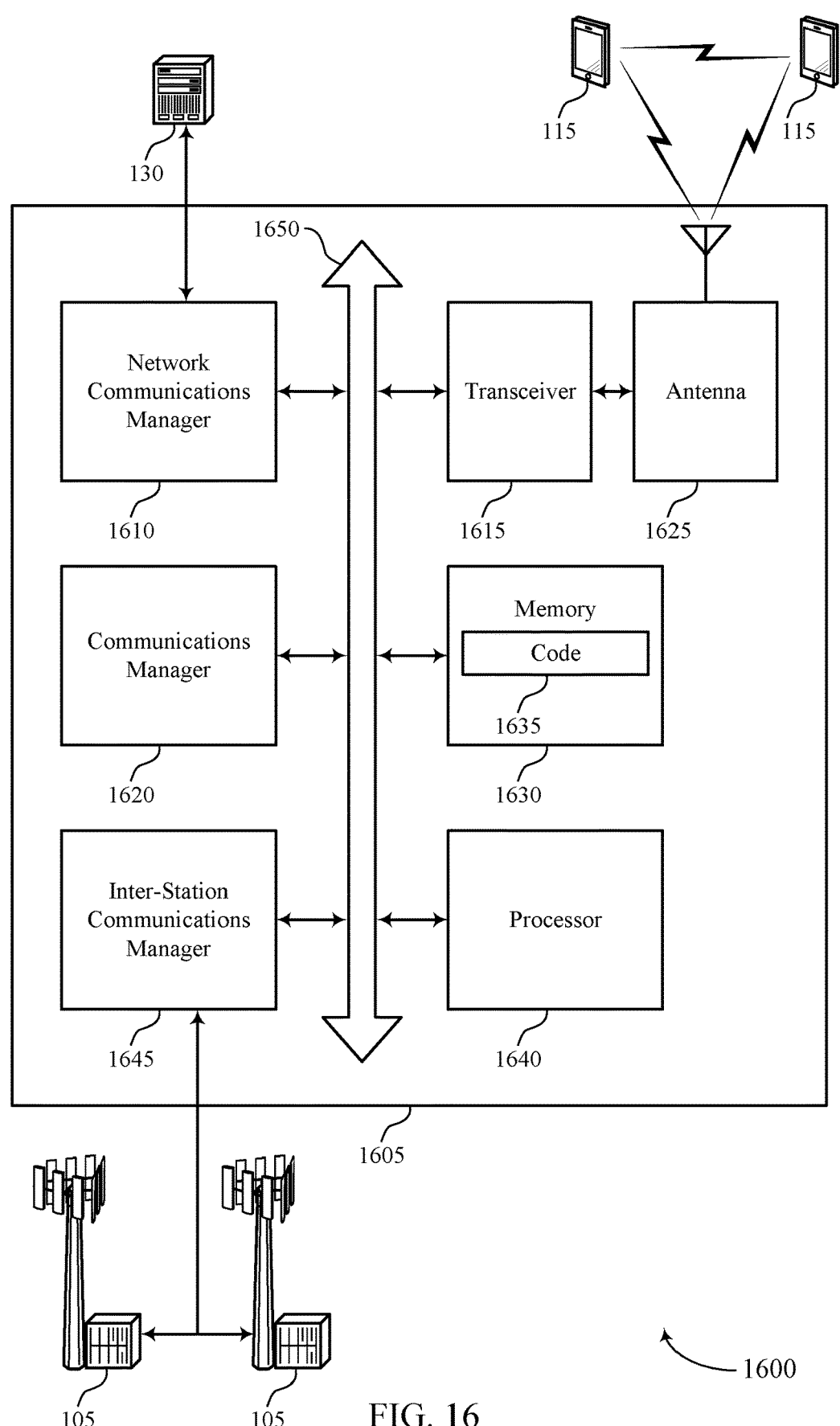
FIG. 16 shows a diagram of a system including a device that supports capability signaling in accordance with aspects of the present disclosure.

FIG. 16 shows a diagram of a system 1600 including a device 1605 that supports capability signaling in accordance with aspects of the present disclosure. The device 1605 may be an example of or include the components of a device 1305, a device 1405, or a network entity 205 as described herein. The device 1605 may communicate wirelessly with one or more network entities 205, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (e.g., operatively, communicatively, functionally, electronically, electrically) via one or more buses (e.g., a bus 1650).

The network communications manager 1610 may manage communications with a core network 130 (e.g., via one or more wired backhaul links). For example, the network communications manager 1610 may manage the transfer of data communications for client devices, such as one or more UEs 115.

In some cases, the device 1605 may include a single antenna 1625. However, in some other cases the device 1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some cases, the code 1635 may not be directly executable by the processor 1640 but may cause a computer (e.g., when compiled and executed) to perform functions described herein. In some cases, the memory 1630 may contain, among other things, a BIOS which may control basic hardware or software operation such as the interaction with peripheral components or devices.

The processor 1640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1640 may be configured to operate a memory array using a memory controller. In some other cases, a memory controller may be integrated into the processor 1640. The processor 1640 may be configured to execute computer-readable instructions stored in a memory (e.g., the memory 1630) to cause the device 1605 to perform various functions (e.g., functions or tasks supporting network and UE capability signaling). For example, the device 1605 or a component of the device 1605 may include a processor 1640 and memory 1630 coupled with the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communication at the device 1605 (e.g., a first network entity) in accordance with examples as disclosed herein. For example, the communications manager 1620 may be configured as or otherwise support a means for receiving a radio capability identifier indicating at least one radio capability of a set of radio capabilities of a UE. The communications manager 1620 may be configured as or otherwise support a means for determining, based at least in part on the radio capability identifier, feedback indicating whether the at least one radio capability indicated by the radio capability identifier satisfies a respective radio capability of a radio capability profile. The communications manager 1620 may be configured as or otherwise support a means for transmitting, to the UE, the feedback.

By including or configuring the communications manager 1620 in accordance with examples as described herein, the device 1605 may support techniques for capability signaling in accordance with aspects of the present disclosure. For example, the device 1605 may indicate whether radio capabilities of a UE satisfy respective radio capabilities of a radio capability profile for an application associated with a UE, which may result in reduced latency, improved user experience related to reduced processing, more efficient utilization of communication resources, and improved utilization of processing capability.

In some examples, the communications manager 1620 may be configured to perform various operations (e.g., receiving, monitoring, transmitting) using or otherwise in cooperation with the transceiver 1615, the one or more antennas 1625, or any combination thereof. Although the communications manager 1620 is illustrated as a separate component, in some examples, one or more functions described herein with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of network and UE capability signaling as described herein, or the processor 1640 and the memory 1630 may be otherwise configured to perform or support such operations.

FIG. 17 shows a flowchart illustrating a method 1700 that supports capability signaling in accordance with aspects of the present disclosure. The operations of the method 1700 may be implemented by a UE or its components as described herein. For example, the operations of the method 1700 may be performed by a UE 115 as described herein with reference to FIGS. 1 through 12. In some examples, a UE may execute a set of instructions to control the functional elements of the UE to perform the described functions herein. Additionally, or alternatively, the UE may perform aspects of the described functions herein using special-purpose hardware.

At 1705, the method may include transmitting, to a first network entity, a radio capability identifier indicating at least one radio capability of a set of radio capabilities of the UE. The operations of 1705 may be performed in accordance with examples as disclosed herein. In some examples, aspects of the operations of 1705 may be performed by a radio capability component 1125 as described herein with reference to FIG. 11.

At 1710, the method may include receiving, from the first network entity, feedback indicating whether the at least one radio capability indicated by the radio capability identifier satisfies a respective radio capability of a radio capability profile for an application associated with the UE. The operations of 1710 may be performed in accordance with examples as disclosed herein. In some examples, aspects of the operations of 1710 may be performed by a feedback component 1130 as described herein with reference to FIG. 11.

At 1715, the method may include establishing a session for the application associated with the UE based at least in part on the feedback indicating whether the at least one radio capability indicated by the radio capability identifier satisfies the respective radio capability of the radio capability profile for the application. The operations of 1715 may be performed in accordance with examples as disclosed herein. In some examples, aspects of the operations of 1715 may be performed by a session component 1135 as described herein with reference to FIG. 11.

FIG. 18 shows a flowchart illustrating a method 1800 that supports capability signaling in accordance with aspects of the present disclosure. The operations of the method 1800 may be implemented by a UE or its components as described herein. For example, the operations of the method 1800 may be performed by a UE 115 as described herein with reference to FIGS. 1 through 12. In some examples, a UE may execute a set of instructions to control the functional elements of the UE to perform the described functions herein. Additionally, or alternatively, the UE may perform aspects of the described functions herein using special-purpose hardware.

At 1805, the method may include receiving, from a second network entity, the radio capability identifier. The operations of 1805 may be performed in accordance with examples as disclosed herein. In some examples, aspects of the operations of 1805 may be performed by a radio capability component 1125 as described herein with reference to FIG. 11.

At 1810, the method may include transmitting, to a first network entity, the radio capability identifier indicating at least one radio capability of a set of radio capabilities of the UE. The operations of 1810 may be performed in accordance with examples as disclosed herein. In some examples, aspects of the operations of 1810 may be performed by a radio capability component 1125 as described herein with reference to FIG. 11.

At 1815, the method may include receiving, from the first network entity, feedback indicating whether the at least one radio capability indicated by the radio capability identifier satisfies a respective radio capability of a radio capability profile for an application associated with the UE. The operations of 1815 may be performed in accordance with examples as disclosed herein. In some examples, aspects of the operations of 1815 may be performed by a feedback component 1130 as described with reference to FIG. 11.

At 1820, the method may include establishing a session for the application associated with the UE based at least in part on the feedback indicating whether the at least one radio capability indicated by the radio capability identifier satisfies the respective radio capability of the radio capability profile for the application. The operations of 1820 may be performed in accordance with examples as disclosed herein. In some examples, aspects of the operations of 1820 may be performed by a session component 1135 as described herein with reference to FIG. 11.

FIG. 19 shows a flowchart illustrating a method 1900 that supports capability signaling in accordance with aspects of the present disclosure. The operations of the method 1900 may be implemented by a network entity or its components as described herein. For example, the operations of the method 1900 may be performed by a network entity 205 as described herein with reference to FIGS. 1 through 8 and 13 through 16. In some examples, a network entity may execute a set of instructions to control the functional elements of the network entity to perform the described functions herein. Additionally, or alternatively, the network entity may perform aspects of the described functions herein using special-purpose hardware.

At 1905, the method may include receiving a radio capability identifier indicating at least one radio capability of a set of radio capabilities of a UE. The operations of 1905 may be performed in accordance with examples as disclosed herein. In some examples, aspects of the operations of 1905 may be performed by a radio capability identifier component 1525 as described herein with reference to FIG. 15.

At 1910, the method may include determining, based at least in part on the radio capability identifier, feedback indicating whether the at least one radio capability indicated by the radio capability identifier satisfies a respective radio capability of a radio capability profile. The operations of 1910 may be performed in accordance with examples as disclosed herein. In some examples, aspects of the operations of 1910 may be performed by a feedback determination component 1530 as described herein with reference to FIG. 15.

At 1915, the method may include transmitting, to the UE, the feedback. The operations of 1915 may be performed in accordance with examples as disclosed herein. In some examples, aspects of the operations of 1915 may be performed by a feedback transmitting component 1535 as described herein with reference to FIG. 15.

FIG. 20 shows a flowchart illustrating a method 2000 that supports capability signaling in accordance with aspects of the present disclosure. The operations of the method 2000 may be implemented by a network entity or its components as described herein. For example, the operations of the method 2000 may be performed by a network entity 205 as described herein with reference to FIGS. 1 through 8 and 13 through 16. In some examples, a network entity may execute a set of instructions to control the functional elements of the network entity to perform the described functions herein. Additionally, or alternatively, the network entity may perform aspects of the described functions herein using special-purpose hardware.

At 2005, the method may include receiving a radio capability identifier indicating at least one radio capability of a set of radio capabilities of a UE. The operations of 2005 may be performed in accordance with examples as disclosed herein. In some examples, aspects of the operations of 2005 may be performed by a radio capability identifier component 1525 as described herein with reference to FIG. 15.

At 2010, the method may include transmitting, to a second network entity, an indication of the radio capability identifier of the UE and an indication of the radio capability profile for an application associated with the UE. The operations of 2010 may be performed in accordance with examples as disclosed herein. In some examples, aspects of the operations of 2010 may be performed by a second network entity component 1540 as described herein with reference to FIG. 15.

At 2015, the method may include receiving, from the second network entity, an indication of whether the at least one radio capability satisfies the respective radio capability of the radio capability profile for the application associated with the UE, the second network entity including a UE capability management function. The operations of 2015 may be performed in accordance with examples as disclosed herein. In some examples, aspects of the operations of 2015 may be performed by a radio capability satisfying component 1545 as described herein with reference to FIG. 15.

At 2020, the method may include determining, based at least in part on the radio capability identifier, feedback indicating whether the at least one radio capability indicated by the radio capability identifier satisfies a respective radio capability of a radio capability profile. The operations of 2020 may be performed in accordance with examples as disclosed herein. In some examples, aspects of the operations of 2020 may be performed by a feedback determination component 1530 as described herein with reference to FIG. 15.

At 2025, the method may include transmitting, to the UE, the feedback. The operations of 2025 may be performed in accordance with examples as disclosed herein. In some examples, aspects of the operations of 2025 may be performed by a feedback transmitting component 1535 as described herein with reference to FIG. 15.

The following provides an overview of aspects of the present disclosure:

Aspect 1: A method for wireless communication at a UE, comprising: transmitting, to a first network entity, a radio capability identifier indicating at least one radio capability of a set of radio capabilities of the UE: receiving, from the first network entity, feedback indicating whether the at least one radio capability indicated by the radio capability identifier satisfies a respective radio capability of a radio capability profile for an application associated with the UE; and establishing a session for the application associated with the UE based at least in part on the feedback indicating whether the at least one radio capability indicated by the radio capability identifier satisfies the respective radio capability of the radio capability profile for the application.

Aspect 2: The method of aspect 1, further comprising: receiving, from a second network entity, the radio capability identifier, wherein transmitting the radio capability identifier is based at least in part on receiving, from the second network entity, the radio capability identifier.

Aspect 3: The method of aspect 2, further comprising: receiving, from the second network entity, a second radio capability identifier based at least in part on a change to one or more radio capabilities of the UE, the second radio capability identifier indicating that the one or more radio capabilities are different: transmitting, to the first network entity, the second radio capability identifier; and receiving, from the first network entity, second feedback indicating whether the one or more radio capabilities indicated by the second radio capability identifier satisfies the respective radio capability of the radio capability profile for the application associated with the UE.

Aspect 4: The method of any of aspects 2 through 3, wherein the second network entity comprises an access and mobility management function or a mobility management entity.

Aspect 5: The method of any of aspects 2 through 4, wherein the radio capability identifier indicates the at least one radio capability of the UE and a radio capability supported by a network serving the UE.

Aspect 6: The method of aspect 5, further comprising: receiving, from the second network entity, a radio capability filter associated with one or more radio capabilities supported by the network serving the UE; and transmitting, to the second network entity, a second set of radio capabilities corresponding to the radio capability filter, wherein receiving, from the second network entity, the radio capability identifier is based at least in part on transmitting, to the second network entity, the second set of radio capabilities corresponding to the radio capability filter.

Aspect 7: The method of any of aspects 1 through 6, wherein receiving the feedback further comprises: receiving, from the first network entity, second feedback indicating that the at least one radio capability indicated by the radio capability identifier satisfies the respective radio capability of the radio capability profile for the application associated with the UE, the second feedback comprising a positive acknowledgement.

Aspect 8: The method of any of aspects 1 through 6, wherein receiving the feedback further comprises: receiving, from the first network entity, second feedback indicating that the at least one radio capability indicated by the radio capability identifier fails to satisfy the respective radio capability of the radio capability profile for the application associated with the UE, the second feedback comprising a negative acknowledgement.

Aspect 9: The method of any of aspects 1 through 8, wherein the radio capability identifier is stored in a memory at the UE.

Aspect 10: The method of any of aspects 1 through 9, wherein the first network entity comprises an AF.

Aspect 11: A method for wireless communication at a first network entity, comprising: receiving a radio capability identifier indicating at least one radio capability of a set of radio capabilities of a UE: determining, based at least in part on the radio capability identifier, feedback indicating whether the at least one radio capability indicated by the radio capability identifier satisfies a respective radio capability of a radio capability profile; and transmitting, to the UE, the feedback.

Aspect 12: The method of aspect 11, wherein determining the feedback further comprises: transmitting, to a second network entity, an indication of the radio capability identifier of the UE and an indication of the radio capability profile for an application associated with the UE; and receiving, from the second network entity, an indication of whether the at least one radio capability satisfies the respective radio capability of the radio capability profile for the application associated with the UE, the second network entity comprising a UE capability management function.

Aspect 13: The method of any of aspects 11 through 12, wherein receiving the radio capability identifier indicating the at least one radio capability of the set of radio capabilities of the UE further comprises: receiving, from the UE, the radio capability identifier, wherein determining the feedback is based at least in part on receiving, from the UE, the radio capability identifier.

Aspect 14: The method of aspect 13, further comprising: receiving, from the UE, a second radio capability identifier indicating one or more radio capabilities that are different: determining, based at least in part on the second radio capability identifier, second feedback indicating whether the one or more radio capabilities indicated by the second radio capability identifier satisfy the respective radio capability of the radio capability profile for an application associated with the UE; and transmitting, to the UE, the second feedback.

Aspect 15: The method of any of aspects 11 through 12, wherein receiving the radio capability identifier indicating the at least one radio capability further comprises: transmitting, to a second network entity, a request for the radio capability identifier; and receiving, from the second network entity, the radio capability identifier, the second network entity comprising an access and mobility management function or a mobility management entity.

Aspect 16: The method of any of aspects 11 through 15, further comprising: transmitting, to the UE, second feedback indicating that the at least one radio capability indicated by the radio capability identifier satisfies the respective radio capability of the radio capability profile for an application associated with the UE, the second feedback comprising a positive acknowledgement.

Aspect 17: The method of any of aspects 11 through 15, further comprising: transmitting, to the UE, second feedback indicating that the at least one radio capability indicated by the radio capability identifier does not satisfy the respective radio capability of the radio capability profile for an application associated with the UE, the second feedback comprising a negative acknowledgement.

Aspect 18: The method of any of aspects 11 through 17, wherein the first network entity comprises an AF.

Aspect 19: An apparatus for wireless communication at a UE, comprising a processor; and a memory coupled with the processor, with instructions stored in the memory, the instructions being executable by the processor to cause the apparatus to perform a method of any of aspects 1 through 10.

Aspect 20: An apparatus for wireless communication at a UE, comprising at least one means for performing a method of any of aspects 1 through 10.

Aspect 21: A non-transitory computer-readable medium storing code for wireless communication at a UE, the code comprising instructions executable by a processor to perform a method of any of aspects 1 through 10.

Aspect 22: An apparatus for wireless communication at a first network entity, comprising a processor; and a memory coupled with the processor, with instructions stored in the memory, the instructions being executable by the processor to cause the apparatus to perform a method of any of aspects 11 through 18.

Aspect 23: An apparatus for wireless communication at a first network entity, comprising at least one means for performing a method of any of aspects 11 through 18.

Aspect 24: A non-transitory computer-readable medium storing code for wireless communication at a first network entity, the code comprising instructions executable by a processor to perform a method of any of aspects 11 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described herein for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described herein in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described herein as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
transmitting, to a first network entity, a radio capability identifier indicating at least one radio capability of a set of radio capabilities of the UE;
receiving, from the first network entity, a feedback signal indicating whether the at least one radio capability indicated by the radio capability identifier satisfies a respective radio capability of a radio capability profile for an application associated with the UE; and
establishing a session for the application associated with the UE based at least in part on the received feedback signal indicating whether the at least one radio capability indicated by the radio capability identifier satisfies the respective radio capability of the radio capability profile for the application.

2. The method of claim 1, further comprising:
receiving, from a second network entity, the radio capability identifier,
wherein transmitting the radio capability identifier is based at least in part on receiving, from the second network entity, the radio capability identifier.

3. The method of claim 2, further comprising:
receiving, from the second network entity, a second radio capability identifier based at least in part on a change to one or more radio capabilities of the set of the radio capabilities of the UE, the second radio capability identifier indicating that the one or more radio capabilities are different;
transmitting, to the first network entity, the second radio capability identifier; and
receiving, from the first network entity, a second feedback signal indicating whether the one or more radio capabilities indicated by the second radio capability identifier satisfies the respective radio capability of the radio capability profile for the application associated with the UE.

4. The method of claim 2, wherein the second network entity comprises an access and mobility management function or a mobility management entity.

5. The method of claim 2, wherein the radio capability identifier indicates the at least one radio capability of the set of the radio capabilities of the UE and a radio capability supported by a network serving the UE.

6. The method of claim 5, further comprising:
receiving, from the second network entity, a radio capability filter associated with one or more radio capabilities supported by the network serving the UE; and
transmitting, to the second network entity, a second set of radio capabilities corresponding to the received radio capability filter, wherein receiving, from the second network entity, the radio capability identifier is based at least in part on transmitting, to the second network entity, the second set of radio capabilities corresponding to the received radio capability filter.

7. The method of claim 1, wherein receiving the feedback signal further comprises:
receiving, from the first network entity, a second feedback signal indicating that the at least one radio capability indicated by the radio capability identifier satisfies the respective radio capability of the radio capability profile for the application associated with the UE, the received second feedback signal comprising a positive acknowledgement.

8. The method of claim 1, wherein receiving the feedback signal further comprises:
receiving, from the first network entity, a second feedback signal indicating that the at least one radio capability indicated by the radio capability identifier fails to satisfy the respective radio capability of the radio capability profile for the application associated with the UE, the received second feedback signal comprising a negative acknowledgement.

9. The method of claim 1, wherein the radio capability identifier is stored in a memory at the UE.

10. The method of claim 1, wherein the first network entity comprises an application function.

11. A method for wireless communication at a first network entity, comprising:

receiving a radio capability identifier indicating at least one radio capability of a set of radio capabilities of a user equipment (UE);

determining, based at least in part on the radio capability identifier, a feedback signal indicating whether the at least one radio capability indicated by the radio capability identifier satisfies a respective radio capability of a radio capability profile; and transmitting, to the UE, the determined feedback signal.

12. The method of claim 11, wherein determining the feedback signal further comprises:

transmitting, to a second network entity, an indication of the radio capability identifier of the UE and an indication of the radio capability profile for an application associated with the UE; and receiving, from the second network entity, an indication of whether the at least one radio capability satisfies the respective radio capability of the radio capability profile for the application associated with the UE, the second network entity comprising a UE capability management function.

13. The method of claim 11, wherein receiving the radio capability identifier indicating the at least one radio capability of the set of radio capabilities of the UE further comprises:

receiving, from the UE, the radio capability identifier, wherein determining the feedback signal is based at least in part on receiving, from the UE, the radio capability identifier.

14. The method of claim 13, further comprising:

receiving, from the UE, a second radio capability identifier indicating one or more radio capabilities that are different;

determining, based at least in part on the second radio capability identifier, a second feedback signal indicating whether the one or more radio capabilities indicated by the second radio capability identifier satisfy the respective radio capability of the radio capability profile for an application associated with the UE; and transmitting, to the UE, the determined second feedback signal.

15. The method of claim 11, wherein receiving the radio capability identifier indicating the at least one radio capability further comprises:

transmitting, to a second network entity, a request for the radio capability identifier; and receiving, from the second network entity, the radio capability identifier, the second network entity comprising an access and mobility management function or a mobility management entity.

16. The method of claim 11, further comprising:

transmitting, to the UE, a second feedback signal indicating that the at least one radio capability indicated by the radio capability identifier satisfies the respective radio capability of the radio capability profile for an application associated with the UE, the second feedback signal comprising a positive acknowledgement.

17. The method of claim 11, further comprising:

transmitting, to the UE, a second feedback signal indicating that the at least one radio capability indicated by the radio capability identifier does not satisfy the respective radio capability of the radio capability profile for an application associated with the UE, the second feedback signal comprising a negative acknowledgement.

18. The method of claim 11, wherein the first network entity comprises an application function.

19. An apparatus for wireless communication at a user equipment (UE), comprising:

a processor; and a memory coupled with the processor, with instructions stored in the memory, the instructions being executable by the processor to cause the apparatus to:

transmit, to a first network entity, a radio capability identifier indicating at least one radio capability of a set of radio capabilities of the UE;

receive, from the first network entity, a feedback signal indicating whether the at least one radio capability indicated by the radio capability identifier satisfies a respective radio capability of a radio capability profile for an application associated with the UE; and establish a session for the application associated with the UE based at least in part on the received feedback signal indicating whether the at least one radio capability indicated by the radio capability identifier satisfies the respective radio capability of the radio capability profile for the application.

20. The apparatus of claim 19, wherein the instructions are further executable by the processor to cause the apparatus to:

receive, from a second network entity, the radio capability identifier, wherein the instructions being executable by the processor to cause the apparatus to transmit the radio capability identifier is based at least in part on receiving, from the second network entity, the radio capability identifier.

21. The apparatus of claim 20, wherein the instructions are further executable by the processor to cause the apparatus to:

receive, from the second network entity, a second radio capability identifier based at least in part on a change to one or more radio capabilities of the set of the radio capabilities of the UE, the second radio capability identifier indicating that the one or more radio capabilities are different;

transmit, to the first network entity, the second radio capability identifier; and receive, from the first network entity, a second feedback signal indicating whether the one or more radio capabilities indicated by the second radio capability identifier satisfies the respective radio capability of the radio capability profile for the application associated with the UE.

22. The apparatus of claim 20, wherein the second network entity comprises an access and mobility management function or a mobility management entity.

23. The apparatus of claim 20, wherein the radio capability identifier indicates the at least one radio capability of the set of the radio capabilities of the UE and a radio capability supported by a network serving the UE.

24. The apparatus of claim 23, wherein the instructions are further executable by the processor to cause the apparatus to:

receive, from the second network entity, a radio capability filter associated with one or more radio capabilities supported by the network serving the UE; and transmit, to the second network entity, a second set of radio capabilities corresponding to the received radio capability filter, wherein receiving, from the second network entity, the radio capability identifier is based at least in part on transmitting, to the second network entity, the second set of radio capabilities corresponding to the received radio capability filter.

25. The apparatus of claim 19, wherein the first network entity comprises an application function.

26. An apparatus for wireless communication at a first network entity, comprising:

a processor; and a memory coupled with the processor, with instructions stored in the memory, the instructions being executable by the processor to cause the apparatus to:

receive a radio capability identifier indicating at least one radio capability of a set of radio capabilities of a user equipment (UE);

determine, based at least in part on the radio capability identifier, a feedback signal indicating whether the at least one radio capability indicated by the radio capability identifier satisfies a respective radio capability of a radio capability profile; and transmit, to the UE, the determined feedback signal.

27. The apparatus of claim 26, wherein the instructions, to determine the feedback signal, are further executable by the processor to cause the apparatus to:

transmit, to a second network entity, an indication of the radio capability identifier of the UE and an indication of the radio capability profile for an application associated with the UE; and receive, from the second network entity, an indication of whether the at least one radio capability satisfies the respective radio capability of the radio capability profile for the application associated with the UE, the second network entity comprising a UE capability management function.

28. The apparatus of claim 26, wherein the instructions, to receive the radio capability identifier indicating the at least one radio capability of the set of radio capabilities of the UE, are further executable by the processor to cause the apparatus to:

receive, from the UE, the radio capability identifier, wherein determining the feedback signal is based at least in part on receiving, from the UE, the radio capability identifier.

29. The apparatus of claim 28, wherein the instructions are further executable by the processor to cause the apparatus to:

receive, from the UE, a second radio capability identifier indicating one or more radio capabilities that are different;

determine, based at least in part on the second radio capability identifier, a second feedback signal indicating whether the one or more radio capabilities indicated by the second radio capability identifier satisfy the respective radio capability of the radio capability profile for an application associated with the UE; and transmit, to the UE, the determined second feedback signal.

30. The apparatus of claim 26, wherein the first network entity comprises an application function.

* * * * *